US012652165B2

(12) United States Patent
Weitzner et al.

(10) Patent No.: US 12,652,165 B2

(45) Date of Patent: Jun. 9, 2026

(54) MULTI-PARTY COMPUTATION SYSTEM

(71) Applicant: Massachusetts Institute of Technology, Cambridge, MA (US)

(72) Inventors: Daniel J. Weitzner, Washington, DC (US); Andrew W Lo, Weston, MA (US); Vinod Vaikuntanathan, Somerville, MA (US); Taylor Reynolds, Belmont, MA (US); Leo R. De Castro, Lexington, KY (US); Jeffrey Schiller, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 114 days.

(21) Appl. No.: 18/690,609

(22) PCT Filed: Sep. 8, 2022

(86) PCT No.: PCT/US2022/042952

§ 371 (c)(1),
(2) Date: Mar. 8, 2024

(87) PCT Pub. No.: WO2023/039098

PCT Pub. Date: Mar. 16, 2023

(65) Prior Publication Data

US 2025/0015979 A1 Jan. 9, 2025

Related U.S. Application Data

(60) Provisional application No. 63/242,144, filed on Sep. 9, 2021, provisional application No. 63/242,150, filed on Sep. 9, 2021.

(51) Int. Cl.
*H04L 9/08* (2006.01)
*H04L 9/40* (2022.01)

(52) U.S. Cl.
CPC .............. *H04L 9/085* (2013.01); *H04L 63/14* (2013.01); *H04L 2209/46* (2013.01)

(58) Field of Classification Search
CPC ...... H04L 9/085; H04L 63/14; H04L 2209/46
See application file for complete search history.

(56) References Cited

U.S. PATENT DOCUMENTS

| | | | | |
|---|---|---|---|---|
| 2018/0173894 A1* | 6/2018 | Boehler | | G06F 16/285 |
| 2020/0279045 A1* | 9/2020 | Tueno | | H04L 9/0841 |

OTHER PUBLICATIONS

Castro, "Practical Homomorphic Encryption Implementations & Applications", Feb. 2020 (Year: 2020).*

(Continued)

*Primary Examiner* — Henry Tsang

(74) *Attorney, Agent, or Firm* — Wolf, Greenfield & Sacks, P.C.

(57) ABSTRACT

Some embodiments relate to a system for performing a multi-party computation among a plurality of parties. The system receives encrypted data sets generated by devices associated with the plurality of parties, wherein each of the encrypted data sets is generated by a respective one of the devices by encrypting data using a key shared among the devices. The system performs a computation on an aggregate of the encrypted data sets to obtain an encrypted result of the computation. The system transmits the encrypted result of the computation to at least two of the devices. The system receives partially decrypted shares of the encrypted result generated by the at least two devices, wherein each of the partially decrypted shares is generated by a respective one of the least two devices by partially decrypting the encrypted result using a private key of the respective device. The system generates a decrypted result of the computation using the partially decrypted shares of the encrypted result.

17 Claims, 16 Drawing Sheets

(56) References Cited

OTHER PUBLICATIONS

International Search Report and Written Opinion for International Application No. PCT/US2022/042952 mailed Dec. 20, 2022.

International Preliminary Report on Patentability for International Application No. PCT/US2022/042952 mailed Mar. 21, 2024.

Benaloh, ElectionGuard Preliminary Specification v0.85. Sep. 2019 https://github.com/microsoft/ElectionGuard-SDK-specification/blob/master/Informal/ElectionGuardSpecificationv0.85.pdf (Last accessed Dec. 6, 2022).

Elahi et al., Privex: Private collection of traffic statistics for anonymous communication networks. Proceedings of the 2014 ACM SIGSAC Conference on Computer and Communications Security Nov. 3, 2014:1068-79.

Melis et al., Efficient private statistics with succinct sketches. arXiv preprint arXiv:1508.06110. Jan. 6, 2016. 15 pages.

Pereira, Internet voting with Helios. Real-World Electronic Voting: Design, Analysis and Deployment. 2016. 36 pages.

Pestana et al., Themis: Decentralized and trustless ad platform with reporting integrity. arXiv preprint arXiv:2007.05556. Jul. 10, 2020. 17 pages.

[No Author Listed], csail / ipri-scram. Github. https://github.com/CSAIL/ipri-scram. Last accessed Apr. 8, 2025. 3 pages.

De Castro et al., SCRAM: A Platform for Securely Measuring Cyber Risk. HDSR. Sep. 16, 2020;2:76.

* cited by examiner

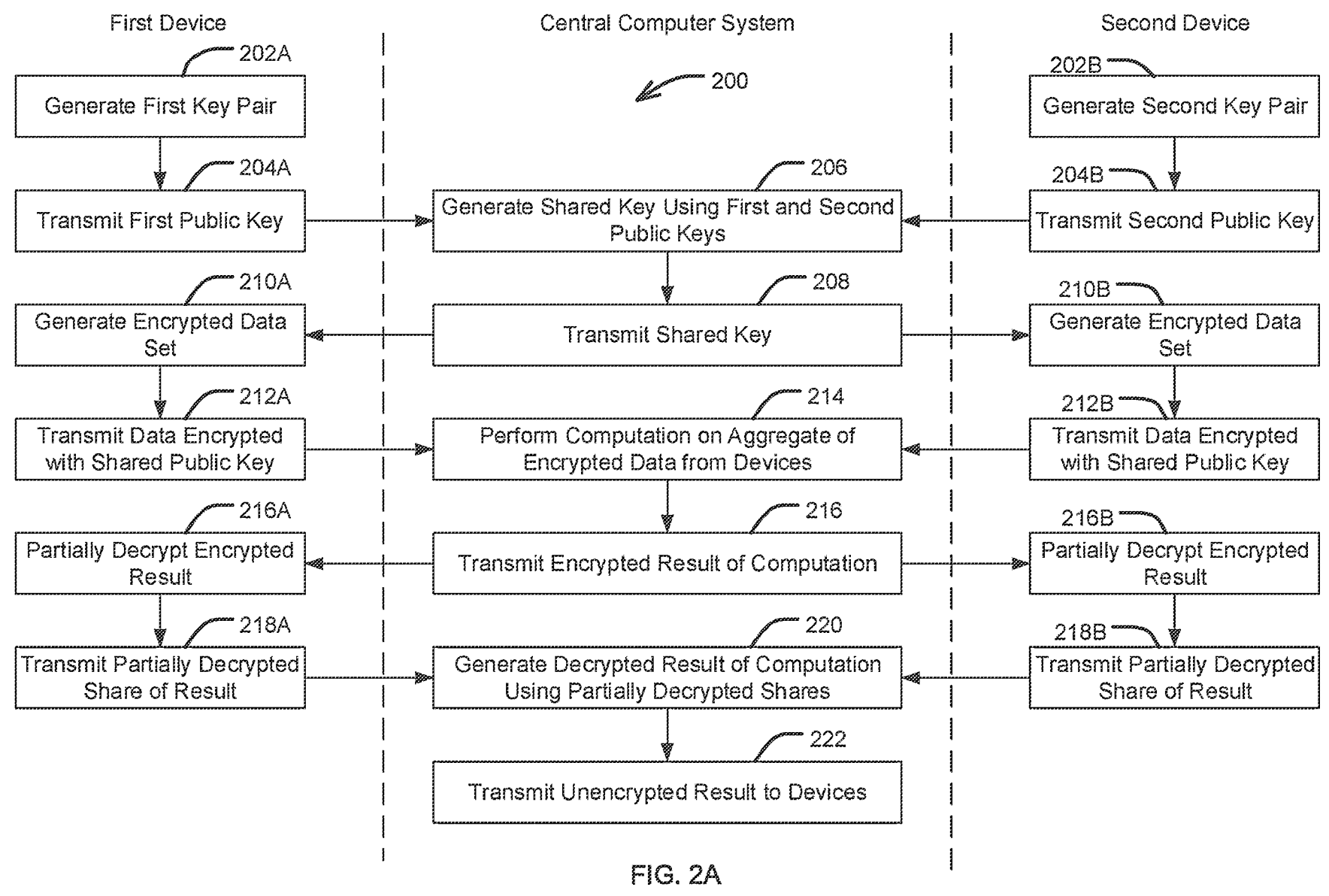

Second Device

202B — Generate Second Key Pair

204B — Transmit Second Public Key

210B — Generate Encrypted Data Set

212B — Transmit Data Encrypted with Shared Public Key

216B — Partially Decrypt Encrypted Result

218B — Transmit Partially Decrypted Share of Result

Central Computer System

200

206 — Generate Shared Key Using First and Second Public Keys

208 — Transmit Shared Key

214 — Perform Computation on Aggregate of Encrypted Data from Devices

216 — Transmit Encrypted Result of Computation

220 — Generate Decrypted Result of Computation Using Partially Decrypted Shares

222 — Transmit Unencrypted Result to Devices

First Device

202A — Generate First Key Pair

204A — Transmit First Public Key

210A — Generate Encrypted Data Set

212A — Transmit Data Encrypted with Shared Public Key

216A — Partially Decrypt Encrypted Result

218A — Transmit Partially Decrypted Share of Result

FIG. 2A

Step 2: Maturity levels

| Category | Control | Mark with an "X" | | | | Status |
|---|---|---|---|---|---|---|
| | | Not Implemented | Partially Implemented | Largely Implemented | Fully Implemented | |
| 5. Training | 5a. Evaluate employee skills | | | | 1 | OK |
| | 5b. Deliver regular training | | | | 1 | OK |
| 6. Backup | 6a. Perform regular backups of systems | | | | 1 | OK |
| | 6b. Test backup data | | | | 1 | OK |
| | 6c. Protect backups | | | | 1 | OK |
| | 6d. Store backups in offline location | | | | 1 | OK |
| 7. Patch | 7a. Deploy updates and patches in a timely manner | | | | 1 | OK |
| | 7b. Implement a centralized patch management system | | | | 1 | OK |
| | 7c. Apply patches using a risk-based approach | | | | 1 | OK |
| 8. Incident response | 8a. Codify an incident response plan | | | | 1 | OK |
| | 8b. Test your incident response plan | | | | 1 | OK |
| | 8c. Maintain your incident response plan | | | | 1 | OK |
| 9. Check the work | 9a. Establish an external penetration testing program | | | | 1 | OK |
| | 9b. Perform red team exercises | | | | 1 | OK |

Step 2. Maturity levels

| Category | Control | | | | | |
|---|---|---|---|---|---|---|
| | | Mark with an "x" | | | | Status |
| | | Not Implemented | Partially Implemented | Largely Implemented | Fully Implemented | |
| 10. Segment | 10a. Adopt network segmentation to ensure isolation of critical systems in an | | | | 1 | OK |

↓ or ✕

Note: If there were no incidents in 2019, 2020, or 2021 with losses over $1,000, then stop here. Otherwise, continue to Step 3 (below) and Step 4 (to the right)

806

Step 3: Incidents and losses

| | | Input number | Status |
|---|---|---|---|
| Incidents | 11a. Number of significant incidents over three years (sum of 2019, 2020, 2021) ( see note*): | 1 | OK |
| Cyber loss estimate (all incidents) | 11b. Total cyber losses for all incidents combined over 3 years, US$, (sum of 2019, 2020, 2021): | $4,000 | OK |

| Step 4: Identifying failures | | Status |
| --- | --- | --- |
| | Mark with an "X" | |
| | Select up to 5 controls that failed during incidents that incurred the greatest financial losses. This includes either a control failure, or a lack of a control that could have prevented the loss. | |
| 1a | | OK |
| 2a | | OK |
| 2b | | OK |
| 3a | 1 | OK |
| 3b | 1 | OK |
| 4a | 1 | OK |
| 4b | 1 | OK |
| 5a | 1 | OK |
| 5b | | OK |
| 6a | | OK |
| 6b | | OK |
| 6c | | OK |
| 6d | | OK |
| 7a | | OK |

800

808

Step 4: Identifying failures

Mark with an "x"

| | Select up to 5 controls that failed during incidents that incurred the greatest financial losses. This includes either a control failure, or a lack of a control that could have prevented the loss. | Status |
|---|---|---|
| 7b | | OK |
| 7c | | OK |
| 8a | | OK |
| 8b | | OK |
| 8c | | OK |
| 9a | | OK |
| 9b | | OK |
| 10a | | OK |

FIG. 8
CONTINUED

MULTI-PARTY COMPUTATION SYSTEM

RELATED APPLICATIONS

This application is a national stage filing under 35 U.S.C. § 371 of international application number PCT/US2022/042952, filed Sep. 8, 2022, which claims priority under 35 U.S.C. § 119(e) to U.S. Provisional Patent Application No. 63/242,144, filed Sep. 9, 2021, and U.S. Provisional Patent Application No. 63/242,150, filed Sep. 9, 2021, each of which is herein incorporated by reference in its entirety.

FIELD

This application relates generally to a multi-party computation system. In particular, the multi-party computation system aggregates data encrypted by different party devices, and performs a computation on an aggregate encrypted data set. The multi-party computation system then generates a decrypted result of the computation performed on the aggregate data, such that data of any party is not revealed to any of the other parties involved in the computation.

BACKGROUND

A computer system of a party may be a target of a cyber-attack by an adversarial entity (e.g., a hacker). The security system of the computer system may be breached by the adversarial entity, and private information may be accessed by the adversarial entity. The cyber-attack may result in data and monetary loss for the party. For example, a cyber-attack on a bank's computer system may result in private account information being revealed, and monetary loss bank. A party often has to investigate the cause of the target.

SUMMARY

Aspects of the present application relate to techniques of performing a multi-party computation while protecting information of each party involved in the computation from being revealed to any other party. The techniques involve generating a key (e.g., an encryption key) by combining keys obtained from multiple party devices. The key is then shared with each party involved in a computation. Each party uses the shared key to encrypt its respective data. Each party provides its encrypted data for the computation. The encrypted data from the parties is aggregated, and a computation is performed on the aggregate encrypted data. A result of the computation performed on the encrypted data is then decrypted jointly by multiple parties. Each of multiple parties performs a partial decryption using a private key, and the partial decryptions are combined to obtain a decrypted result of the computation. The multi-party computation thus allows the computation to be performed while protecting data from any one party being revealed to another party.

In some embodiments, a system for performing a multi-party computation among a plurality of parties is provided. The system comprises: a processor; and a non-transitory computer-readable storage medium storing instructions that, when executed by the processor, cause the processor to: receive encrypted data sets generated by devices associated with the plurality of parties, wherein each of the encrypted data sets is generated by a respective one of the devices by encrypting data using a key shared among the devices; perform a computation on an aggregate of the encrypted data sets to obtain an encrypted result of the computation;

transmit the encrypted result of the computation to at least two of the devices associated with at least two of the plurality of parties; receive partially decrypted shares of the encrypted result generated by the at least two devices, wherein each of the partially decrypted shares is generated by a respective one of the least two devices by partially decrypting the encrypted result using a private key of the respective device; and generate a decrypted result of the computation using the partially decrypted shares of the encrypted result.

In some embodiments, the instructions cause the processor to: generate the shared key, the generating comprising: receiving keys from at least some of the devices, the at least some devices including the at least two devices; and generating the shared key using the keys received from the at least some devices; and transmit the shared key to the devices. In some embodiments, wherein the keys received from the at least some devices are public keys corresponding to private keys of the at least some devices. In some embodiments, the at least some devices include one or more devices in addition to the at least two devices. In some embodiments, the devices consist of the at least some devices. In some embodiments, the devices include one or more devices in addition to the at least some devices.

In some embodiments, the shared key comprises a public key. In some embodiments, the instructions cause the processor to transmit the decrypted result to the devices. In some embodiments, generating the decrypted result of the computation comprises combining the partially decrypted shares of the encrypted result to obtain the decrypted result of the computation. In some embodiments, each of the encrypted data sets comprises an encryption of cybersecurity information of a respective one of the plurality of parties.

In some embodiments, each of the encrypted data sets is: checked for at least one error by a respective one of the devices; and received by the system after it is determined that the encrypted data set does not have the at least one error. In some embodiments, the at least one error for an encrypted data set comprises: presence of non-numerical data in the encrypted data set; presence of an input value outside of an allowed range for the input value; and/or an incomplete form in the encrypted data set.

In some embodiments, the instructions cause the processor to: prior to performing the computation on an aggregate of the encrypted data sets: determine whether performance of the computation would reveal information about any of the plurality of parties; and perform the computation on the aggregate of the encrypted data sets when it is determined that performance of the computation would not reveal information about any of the plurality of parties. In some embodiments, determining whether performance of the computation would reveal information about any of the plurality of parties comprises determining if the aggregate of the encrypted data set includes an outlier.

In some embodiments, a method for performing a multi-party computation among a plurality of parties is provided. The method comprises: receiving encrypted data sets generated by devices associated with the plurality of parties, wherein each of the encrypted data sets is generated by a respective one of the devices by encrypting data using a key shared among the devices to obtain the encrypted data set; performing a computation on an aggregate of the encrypted data sets to obtain an encrypted result of the computation; transmitting the encrypted result of the computation to at least two of the devices associated with at least two of the plurality of parties; receiving partially decrypted shares of the encrypted result generated by the at least two devices, wherein each of the partially decrypted shares is generated by a respective one of the least two devices by partially decrypting the encrypted result using a private key of the respective device; and generating a decrypted result of the computation using the partially decrypted shares of the encrypted result.

In some embodiments, the method further comprises: generating the shared key, the generating comprising: receiving keys from at least some of the devices, the at least some devices including the at least two devices; and generating the shared key using the keys received from the at least some devices; and transmitting the shared key to the devices. In some embodiments, the keys received from the at least some devices are public keys corresponding to private keys of the at least some devices.

In some embodiments, a non-transitory computer-readable storage medium storing instructions is provided. The instructions, when executed by a processor, cause the processor to perform: receiving encrypted data sets generated by devices associated with a plurality of parties, wherein each of the encrypted data sets is generated by a respective one of the devices by encrypting data using a key shared among the devices to obtain the encrypted data set; performing a computation on an aggregate of the encrypted data sets to obtain an encrypted result of the computation; transmitting the encrypted result of the computation to at least two of the devices associated with at least two of the plurality of parties; receiving partially decrypted shares of the encrypted result generated by the at least two devices, wherein each of the partially decrypted shares is generated by a respective one of the least two devices by partially decrypting the encrypted result using a private key of the respective device; and generating a decrypted result of the computation using the partially decrypted shares of the encrypted result.

In some embodiments, a device is provided. The device comprises: a processor; and non-transitory computer-readable storage medium storing instructions that, when executed by the processor, cause the processor to: receive, from a computer system, a key shared with one or more other devices; encrypt data using the shared key to obtain an encrypted data set; transmit, to the computer system, the encrypted data set; receive, from the computer system, an encrypted result of a computation performed on an aggregate of: the encrypted data set; and one or more encrypted data sets generated by the one or more other devices; partially decrypt, using a private key of the device, the encrypted result to obtain a partially decrypted share of the encrypted result; transmit, to the computer system, the partially decrypted share of the encrypted result; and receive, from the computer system, a decrypted result of the computation.

In some embodiments, the instructions further cause the processor to: generate a public key corresponding to the private key of the device; transmit, to the computer system, the public key; and receive, from the computer system, the shared key, wherein the shared key is generated by the computer system using the public key. In some embodiments, the shared key is generated by the computer system using the public key and one or more public keys of the one or more other devices.

In some embodiments, the instructions cause the processor to: determine whether the data has at least one error in the data; and transmit the encrypted data after determining that the data does not have the at least one error. In some embodiments, determining whether the data has the at least one error comprises determining whether the data includes non-numerical data, whether the data includes an input value outside of an allowed range for the input value, and/or whether the data includes an incomplete form.

In some embodiments, the data comprises cybersecurity information. In some embodiments, the decrypted result of the computation is generated from the partially decrypted share and at least one partially decrypted share generated by at least one of the one or more other devices.

In some embodiments, a system for performing a multi-party computation among a plurality of parties is provided. The system comprises: a processor; and a non-transitory computer-readable storage medium storing instructions that, when executed by the processor, cause the processor to perform: receive encrypted data sets generated by devices associated with the plurality of parties, wherein each of the encrypted data sets is generated by a respective one of the devices by encrypting data using a key shared among the devices; identify a first subset of encrypted data sets among the encrypted data sets that share a first characteristic; perform a first computation on an aggregate of the first subset of encrypted data sets to obtain an encrypted result of the first computation; transmit the encrypted result of the first computation to at least two of the devices associated with at least two of the plurality of parties; receive partially decrypted shares of the result of the first computation from the at least two devices; and generate a decrypted result of the first computation performed on the first subset of encrypted data sets by combining the partially decrypted shares of the result of the first computation.

In some embodiments, the instructions cause the processor to: identify a second subset of encrypted data sets among the encrypted data sets that share a second characteristic; perform a second computation on an aggregate of the identified second subset of encrypted data sets; transmit an encrypted result of the second computation to the at least two devices; receive partially decrypted shares of the result of the second computation from the at least two devices; and generate a decrypted result of the second computation performed on the aggregate of the second subset of encrypted data sets by combining the partially decrypted shares of the result of the second computation.

In some embodiments, the instructions cause the processor to generate, for each of at least some of the encrypted data sets, tag data, wherein the tag data indicates one or more characteristics about a party associated with the encrypted data set. In some embodiments, the instructions cause the processor to identify the first subset of encrypted data sets that share the first characteristic using tag data associated with the first subset of encrypted data sets. In some embodiments, generating the tag data for each of the at least some encrypted data sets comprises: obtaining information about a party associated with the encrypted data set; and generating the tag data using the obtained information.

In some embodiments, the instructions cause the processor to: determine a number of encrypted data sets in the first subset of encrypted data sets; determine that the number of encrypted data sets is greater than a threshold number of encrypted data sets; and perform the first computation on the aggregate of the first subset of encrypted data sets after determining that the number of encrypted data sets is greater than the threshold number of encrypted data sets.

In some embodiments, the instructions cause the processor to: identify a second subset of encrypted data sets among the encrypted data sets that share a second characteristic; determine a number of encrypted data sets in the second subset of encrypted data sets; determine that the number of encrypted data sets is less than a threshold number of encrypted data sets; and prevent performance of a second computation on an aggregate of the second subset of encrypted data sets after determining that the number of encrypted data sets is less than the threshold number of encrypted data sets.

In some embodiments, the instructions cause the processor to: generate the shared key, the generating comprising: receiving keys from at least some of the devices, the at least some devices including the at least two devices; and generating the shared key using the keys received from the at least some devices; and transmit the shared key to the devices. In some embodiments, the keys received from the at least two devices are public keys corresponding to respective private keys. In some embodiments, the at least some devices include one or more devices in addition to the at least two devices. In some embodiments, the devices include one or more devices in addition to the at least some devices.

In some embodiments, a method for performing a multi-party computation among a plurality of parties is provided. The method comprises: receiving encrypted data sets generated by devices associated with the plurality of parties, wherein each of the encrypted data sets is generated by a respective one of the devices by encrypting data using a key shared among the devices; identifying a first subset of encrypted data sets among the encrypted data sets that share a first characteristic; performing a first computation on an aggregate of the first subset of encrypted data sets to obtain an encrypted result of the first computation; transmitting the encrypted result of the first computation to at least two of the devices associated with at least two of the plurality of parties; receiving partially decrypted shares of the result of the first computation from the at least two devices; and generating a decrypted result of the first computation performed on the first subset of encrypted data sets by combining the partially decrypted shares of the result of the first computation.

In some embodiments, the method further comprises: identifying a second subset of encrypted data sets among the encrypted data sets that share a second characteristic; performing a second computation on an aggregate of the identified second subset of encrypted data sets; transmitting an encrypted result of the second computation to the at least two devices; receiving partially decrypted shares of the result of the second computation from the at least two devices; and generating a decrypted result of the second computation performed on the aggregate of the second subset of encrypted data sets by combining the partially decrypted shares of the result of the second computation.

In some embodiments, the method further comprises generating, for each of at least some of the plurality of encrypted data sets, tag data, wherein the tag data indicates one or more characteristics about a party associated with the encrypted data set. In some embodiments, identifying the first subset of encrypted data sets among the encrypted data sets comprises identifying the first subset of encrypted data sets that share the first characteristic using the tag data. In some embodiments, generating the tag data comprises: for each of the at least some encrypted data sets: obtaining information about a party associated with a device that generated the encrypted data set; and generating the tag data using the obtained information.

In some embodiments, the method further comprises: determining a number of encrypted data sets in the first subset of encrypted data sets; determining that the number of encrypted data sets is greater than a threshold number of encrypted data sets; and performing the first computation on the aggregate of the first subset of encrypted data sets after determining that the number of encrypted data sets is greater than the threshold number of encrypted data sets. In some embodiments, the method further comprises: identifying a second subset of encrypted data sets among the encrypted data sets that share a second characteristic; determining a number of encrypted data sets in the second subset of encrypted data sets; determining that the number of encrypted data sets is less than a threshold number of encrypted data sets; and preventing performance of a second computation on an aggregate of the second subset of encrypted data sets after determining that the number of encrypted data sets is less than the threshold number of encrypted data sets.

In some embodiments, a non-transitory computer-readable storage medium storing instructions is provided. The instructions, when executed by a processor, cause the processor to perform: receiving encrypted data sets generated by devices associated with a plurality of parties, wherein each of the encrypted data sets is generated by a respective one of the devices by encrypting data using a key shared among the devices; identifying a first subset of encrypted data sets among the encrypted data sets that share a first characteristic; performing a first computation on an aggregate of the first subset of encrypted data sets to obtain an encrypted result of the first computation; transmitting the encrypted result of the first computation to at least two of the devices associated with at least two of the plurality of parties; receiving partially decrypted shares of the result of the first computation from the at least two devices; and generating a decrypted result of the first computation performed on the first subset of encrypted data sets by combining the partially decrypted shares of the result of the first computation.

In some embodiments, the method further comprises: identifying a second subset of encrypted data sets among the encrypted data sets that share a second characteristic; performing a second computation on an aggregate of the identified second subset of encrypted data sets; transmitting an encrypted result of the second computation to the at least two devices; receiving partially decrypted shares of the result of the second computation from the at least two devices; and generating a decrypted result of the second computation performed on the aggregate of the second subset of encrypted data sets by combining the partially decrypted shares of the result of the second computation.

In some embodiments, the method further comprises generating, for each of at least some of the plurality of encrypted data sets, tag data, wherein the tag data indicates one or more characteristics about a party associated with the encrypted data set. In some embodiments, identifying the first subset of encrypted data sets among the encrypted data sets comprises identifying the first subset of encrypted data sets that share the first characteristic using the tag data.

In some embodiments, a device is provided. The device comprises: a processor; and non-transitory computer-readable storage medium storing instructions that, when executed by the processor, cause the processor to: receive, from a computer system, a key shared with a plurality of other devices; encrypt data using the shared key to obtain an encrypted data set, wherein the encrypted data set has a first characteristic; transmit, to the computer system, the encrypted data set; receive, from the computer system, an encrypted result of a computation performed on an aggregate of: the encrypted data set; and encrypted data sets generated by one or more of the plurality of other devices, wherein the encrypted data set and the encrypted data sets generated by the one or more devices share a first characteristic; partially decrypt, using a private key of the device, the encrypted result to obtain a partially decrypted share of the encrypted result; transmit, to the computer system, the partially decrypted share of the encrypted result; and receive, from the computer system, a decrypted result of the computation.

In some embodiments, the instructions further cause the processor to: generate a public key corresponding to the private key of the device; transmit, to the computer system, the public key; and receive, from the computer system, the shared key, wherein the shared key is generated by the computer system using the public key. In some embodiments, the instructions further cause the processor to: determine whether the data has at least one error in the data; and transmit the encrypted data after determining that the data does not have the at least one error. In some embodiments, determining whether the data has the at least one error comprises determining whether the data includes non-numerical data, whether the data includes an input value outside of an allowed range for the input value, and/or whether the data includes an incomplete form.

In some embodiments, the data comprises cybersecurity information. In some embodiments, the decrypted result of the computation is generated from the partially decrypted share and at least one partially decrypted share generated by at least one of the one or more devices.

The foregoing summary is provided by way of illustration and is not intended to be limiting. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

FIG. 2A illustrate an example process for performing a multi-party computation, according to some embodiments of the technology described herein.

DETAILED DESCRIPTION

Figure 1A:
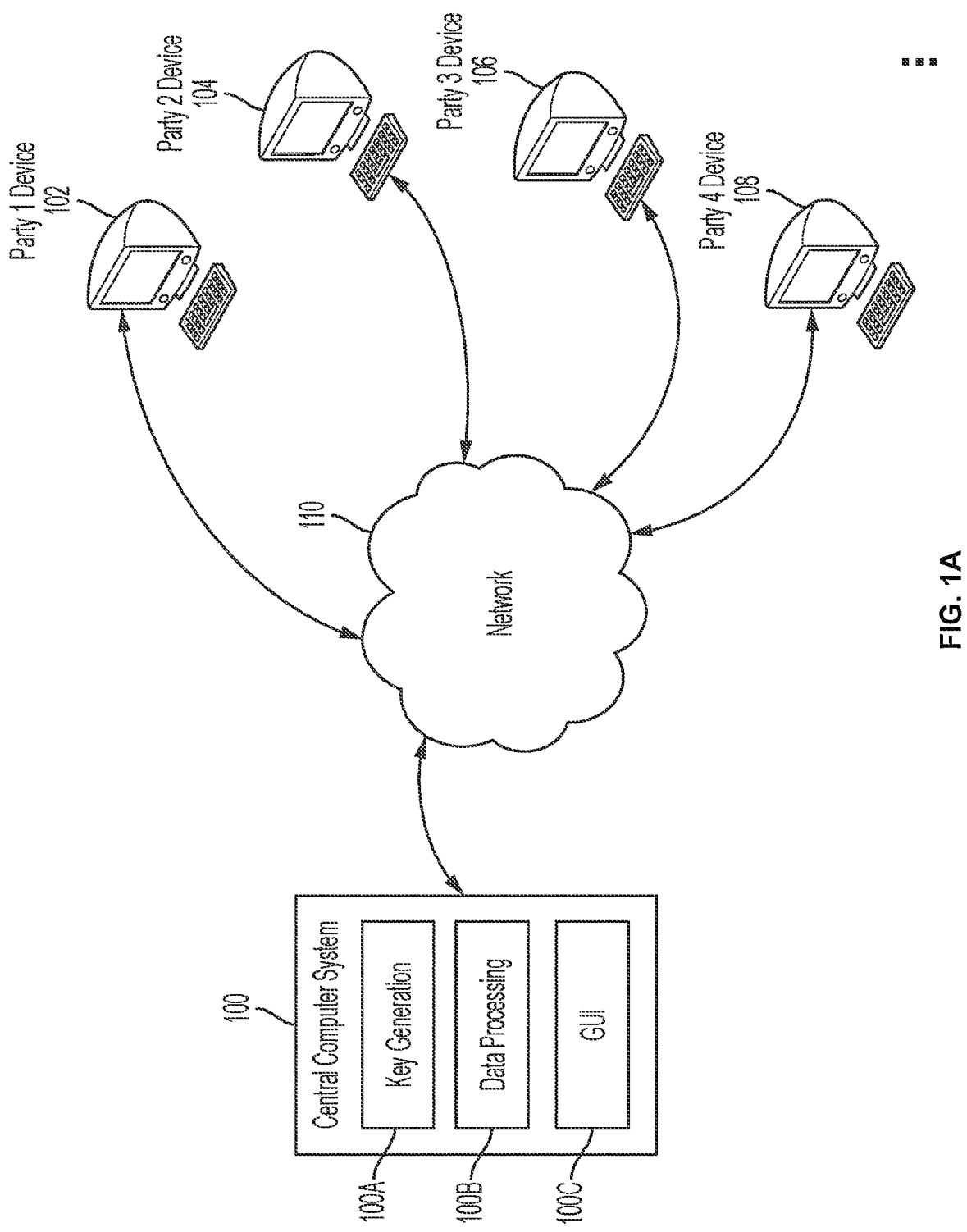
FIG. 1A illustrates an example multi-party computation system, according to some embodiments of the technology described herein.

Described herein are embodiments of a multi-party computation system that performs computations on data aggregated from multiple different parties, while mitigating the risk that information of any one of the parties is revealed to another entity (e.g., another one of the parties). In certain situations, a party (e.g., an organization, firm, company, corporation, individual, etc.) may wish to aggregate its data with data belonging to one or more other parties, but without revealing its data to the other parties. In the context of cybersecurity, in order to learn information about a cybersecurity threat or outcome of a cybersecurity breach (e.g., a cyber-attack, virus, hacker, susceptibility of a particular technology, or resulting outcome thereof), data from several different parties may be needed to understand the cybersecurity threat. As an illustrative example, data from several different parties may be needed to determine effects of cyber-attacks, causes of the cyber-attacks, and/or techniques to prevent the cyber-attacks in the future. In another example, data from several different parties may be needed to determine which areas of cybersecurity are at high risk of being compromised. Accordingly, multiple different parties that wish to gain insight may need to aggregate their cybersecurity data to obtain an understanding of cybersecurity risks. However, parties are often reluctant to share data for multi-party computations as it risks revealing information about the party's cybersecurity technology and/or procedures that the party may wish to keep private (e.g., failures, areas of susceptibility, data breaches, and/or other information). Techniques described herein may be applied to contexts outside of cybersecurity in which parties wish to aggregate data without revealing their data.

Conventional techniques for performing computations using data aggregated from multiple different parties rely on a trusted third party with whom each of the parties would share its data. The third party would thus have access to each party's data and pledge to keep each party's data private, and only reveal information about the aggregated data (e.g., summary statistics). The parties would rely on the third party to encrypt their data and prevent the data from being revealed. The trusted third party, however, is also susceptible to a cybersecurity breach, in which case the parties' data would be exposed. Moreover, parties are reluctant to share their data with a third party due to the risk of the third party accidentally revealing their data (e.g., to one or more other parties).

To address the above-described problems with conventional techniques of performing computations using data aggregated from multiple parties, the inventors have developed a multi-party computation system that can perform computations on data aggregated from multiple parties without requiring any of the parties to reveal their data to another entity (e.g., another party or a trusted third party). The system generates a shared key using keys obtained from multiple parties, and provides the shared key to the parties. Each party encrypts its data using the shared key and provides its encrypted data to the system. The system performs computations on an aggregate of encrypted data received from the parties to obtain an encrypted result. The system cannot access any individual party's data because computations are performed on the aggregate data in its encrypted form. Each of the parties then partially decrypts the encrypted result of the computation performed on the aggregate data and provides its partial decryption to the system. The system combines the partial decryptions to obtain a decrypted result of the computation (e.g., summary statistics). The system thus allows a party to contribute data (e.g., cybersecurity data) to a multi-party computation while mitigating the risk that the data is revealed to another entity.

As conventional techniques require data to be shared and revealed a third party, many parties would be reluctant to perform multi-party computations using Internet communications. By having parties encrypt their data at their respective devices and performing computations on aggregated encrypted data, embodiments of techniques described herein do not require a party to reveal its data to any other entity (e.g., another party or a system performing the computation). For example, gaining access to a data transmission from a party's device does not result in revealing the party's data because the data in the transmission has been encrypted by the device using a shared key. Decryption of the data would require participation of multiple other parties who are involved in the computation. Moreover, by preventing each party's data from being revealed to other entities involved in the computation, the system also allows a multi-party computation to be performed using network communications (e.g., through the Internet) with greater security. The multi-party encryption scheme used in the multi-party computation protects data transmitted through a network from being revealed, even if intercepted by an adversary.

In some embodiments, a system obtains keys (e.g., public keys) from multiple different devices associated with respective parties ("party devices"), and uses the keys to generate a shared key (e.g., a shared public key). The system provides the shared key to the party devices. The system receives encrypted data sets generated by the party. Each party device may encrypt its data using the shared key. The system may perform a computation on an aggregate of the encrypted data sets to obtain an encrypted result of the computation. The system transmits the encrypted result of the computation to multiple ones of the party devices. The party devices perform partial decryptions of the encrypted result using their respective private keys to generate partially decrypted shares of the aggregated result. The system obtains the partially decrypted shares and uses them to generate a decrypted result of the computation.

The inventors have also recognized that parties may wish to obtain targeted insights using data aggregated from multiple parties. For example, a hotel in a geographic region may wish to obtain aggregated information about hotels in the geographic region. As another example, a corporation may wish to obtain aggregated cybersecurity information about corporations with a similar number of employees. Accordingly, the inventors have developed a multi-party computation system that identifies a subset of encrypted data sets among encrypted data sets received from different parties that share a characteristic (e.g., geographic region, company size range, revenue range, and/or other characteristics). The system performs a computation on an aggregate of the identified subset of encrypted data sets. The system thus allows parties to obtain more relevant and customized information without revealing a party's data.

The inventors have further recognized that a party who wishes to participate in a multiparty computation may not wish to generate a keypair (e.g., a private public key pair) that is used to generate a shared key and to decrypt an encrypted result of a computation. For example, a party may want to contribute its cybersecurity data and obtain information generated using cybersecurity data aggregated from multiple parties, but not wish to use cryptographic software to generate keys and/or perform decryption. Accordingly, the inventors have developed techniques that allow parties to participate in a multi-party computation without having to participate in key generation and/or decryption operations. The techniques may allow a large number of parties to be included in a multi-party computation. The multi-party computation may thus be performed more efficiently as fewer parties need to participate perform key generation and participate in decryption of a computation result.

Some embodiments described herein address all the above-described issues that the inventors have recognized with conventional techniques for performing computations on data aggregated from multiple different parties. However, it should be appreciated that not every embodiment described herein addresses every one of these issues. It should also be appreciated that embodiments of the technology described herein may be used for purposes other than addressing the above-discussed issues of conventional techniques. Further, although some example embodiments of the technology may be illustrated herein in the context of cybersecurity data, it should be appreciated that some embodiments may be used with other types of data (e.g., hotel data, retailer data, sales data, etc.).

According to some embodiments, a system for performing a multi-party computation among a plurality of parties is provided. The system may be configured to: receive encrypted data sets generated by devices associated with the plurality of parties, wherein each of the encrypted data sets is generated by a respective one of the devices by encrypting data (e.g., cybersecurity information) using a key shared among the devices (e.g., a shared public key); perform a computation on an aggregate of the encrypted data sets to obtain an encrypted result of the computation (e.g., using a homomorphic encryption scheme); transmit the encrypted result of the computation to at least two of the devices associated with at least two of the plurality of parties; receive partially decrypted shares of the encrypted result generated by the at least two devices, wherein each of the partially decrypted shares is generated by a respective one of the least two devices by partially decrypting the encrypted result using a private key of the respective device; and generate a decrypted result of the computation using the partially decrypted shares of the encrypted result.

In some embodiments, the system may be configured to: generate the shared key, the generating comprising: receiving keys from at least some of the devices, the at least some devices including the at least two devices; and generating the shared key using the keys received from the at least some devices; and transmit the shared key to the devices. In some embodiments, the keys received from the at least some devices are public keys corresponding to private keys of the at least some devices. In some embodiments, the at least some devices include one or more devices in addition to the at least two devices. In some embodiments, the devices consist of the at least some devices. In some embodiments, the devices include one or more devices in addition to the at least some devices.

In some embodiments, the shared key comprises a public key. In some embodiments, the system may be configured to transmit the decrypted result to the devices. In some embodiments, generating the decrypted result of the computation comprises combining the partially decrypted shares of the encrypted result to obtain the decrypted result of the computation. In some embodiments, each of the encrypted data sets comprises an encryption of cybersecurity information of a respective one of the plurality of parties.

In some embodiments, each of the encrypted data sets is: checked for at least one error by a respective one of the devices; and received by the system after it is determined that the encrypted data set does not have the at least one error. In some embodiments, the at least one error for an encrypted data set comprises: presence of non-numerical data in the encrypted data set; presence of an input value outside of an allowed range for the input value; and/or an incomplete form in the encrypted data set.

In some embodiments, the system may be configured to: prior to performing the computation on an aggregate of the encrypted data sets: determine whether performance of the computation would reveal information about any of the plurality of parties; and perform the computation on the aggregate of the encrypted data sets when it is determined that performance of the computation would not reveal information about any of the plurality of parties. In some embodiments, determining whether performance of the computation would reveal information about any of the plurality of parties comprises determining if the aggregate of the encrypted data set includes an outlier.

According to some embodiments, a device for participating in a multi-party computation is provided. The device may be configured to: receive, from a computer system, a key shared with one or more other devices; encrypt data using the shared key to obtain an encrypted data set; transmit, to the computer system, the encrypted data set; receive, from the computer system, an encrypted result of a computation performed on an aggregate of: the encrypted data set; and one or more encrypted data sets generated by the one or more other devices; partially decrypt, using a private key of the device, the encrypted result to obtain a partially decrypted share of the encrypted result; transmit, to the computer system, the partially decrypted share of the encrypted result; and receive, from the computer system, a decrypted result of the computation.

In some embodiments, the device may be configured to: generate a public key corresponding to the private key of the device; transmit, to the computer system, the public key; and receive, from the computer system, the shared key, wherein the shared key is generated by the computer system using the public key. In some embodiments, the shared key is generated by the computer system using the public key and one or more public keys of the one or more other devices.

In some embodiments, the device may be configured to: determine whether the data has at least one error in the data; and transmit the encrypted data after determining that the data does not have the at least one error. In some embodiments, determining whether the data has the at least one error comprises determining whether the data includes non-numerical data, whether the data includes an input value outside of an allowed range for the input value, and/or whether the data includes an incomplete form. In some embodiments, the decrypted result of the computation is generated from the partially decrypted share and at least one partially decrypted share generated by at least one of the one or more other devices.

According to some embodiments, a system for performing a multi-party computation among a plurality of parties is provided. The system may be configured to: receive encrypted data sets (e.g., encrypted cybersecurity data) generated by devices associated with the plurality of parties, wherein each of the encrypted data sets is generated by a respective one of the devices by encrypting data using a key (e.g., a public key) shared among the devices; identify a first subset of encrypted data sets among the encrypted data sets that share a first characteristic (e.g., a geographic region, company size, range of revenue, etc.); perform a first computation (e.g., sum, average, or other computation) on an aggregate of the first subset of encrypted data sets (e.g., using a homomorphic encryption scheme) to obtain an encrypted result of the first computation; transmit the encrypted result of the first computation to at least two of the devices associated with at least two of the plurality of parties; receive partially decrypted shares of the result of the first computation from the at least two devices (e.g., decrypted using private keys of the devices); and generate a decrypted result of the first computation performed on the first subset of encrypted data sets by combining the partially decrypted shares of the result of the first computation.

In some embodiments, the system may be configured to: identify a second subset of encrypted data sets among the encrypted data sets that share a second characteristic; perform a second computation on an aggregate of the identified second subset of encrypted data sets; transmit an encrypted result of the second computation to the at least two devices; receive partially decrypted shares of the result of the second computation from the at least two devices; and generate a decrypted result of the second computation performed on the aggregate of the second subset of encrypted data sets by combining the partially decrypted shares of the result of the second computation.

In some embodiments, the system may be configured to generate, for each of at least some of the encrypted data sets, tag data, wherein the tag data indicates one or more characteristics (e.g., geographic region, size, revenue, etc.) about a party associated with the encrypted data set. In some embodiments, the system may be configured to identify the first subset of encrypted data sets that share the first characteristic using tag data associated with the first subset of encrypted data sets. In some embodiments, generating the tag data for each of the at least some encrypted data sets comprises: obtaining information about a party associated with the encrypted data set (e.g., from a website associated with the party); and generating the tag data using the obtained information.

In some embodiments, the system may be configured to: determine a number of encrypted data sets in the first subset of encrypted data sets; determine that the number of encrypted data sets is greater than a threshold number (e.g., 1, 2, 3, 4, or 5) of encrypted data sets; and perform the first computation on the aggregate of the first subset of encrypted data sets after determining that the number of encrypted data sets is greater than the threshold number of encrypted data sets. In some embodiments, the system may be configured to: identify a second subset of encrypted data sets among the encrypted data sets that share a second characteristic; determine a number of encrypted data sets in the second subset of encrypted data sets; determine that the number of encrypted data sets is less than a threshold number (e.g., 1, 2, 3, 4, 5) of encrypted data sets; and prevent performance of a second computation on an aggregate of the second subset of encrypted data sets after determining that the number of encrypted data sets is less than the threshold number of encrypted data sets.

In some embodiments, the system may be configured to: generate the shared key, the generating comprising: receiving keys from at least some of the devices, the at least some devices including the at least two devices; and generating the shared key using the keys received from the at least some devices; and transmit the shared key to the devices. In some embodiments, the keys received from the at least two devices are public keys corresponding to respective private keys. In some embodiments, the at least some devices include one or more devices in addition to the at least two devices. In some embodiments, the devices include one or more devices in addition to the at least some devices.

According to some embodiments, a device for participating in a multi-party computation is provided is provided. The device may be configured to: receive, from a computer system, a key shared with a plurality of other devices; encrypt data (e.g., cybersecurity information) using the shared key to obtain an encrypted data set, wherein the encrypted data set has a first characteristic; transmit, to the computer system, the encrypted data set; receive, from the computer system, an encrypted result of a computation performed on an aggregate of: the encrypted data set; and encrypted data sets generated by one or more of the plurality of other devices, wherein the encrypted data set and the encrypted data sets generated by the one or more devices share a first characteristic (e.g., geographic region, number of employees, revenue range); partially decrypt, using a private key of the device, the encrypted result to obtain a partially decrypted share of the encrypted result; transmit, to the computer system, the partially decrypted share of the encrypted result; and receive, from the computer system, a decrypted result of the computation.

In some embodiments, the device may be configured to: generate a public key corresponding to the private key of the device; transmit, to the computer system, the public key; and receive, from the computer system, the shared key, wherein the shared key is generated by the computer system using the public key. In some embodiments, the device may be configured to: determine whether the data has at least one error in the data; and transmit the encrypted data after determining that the data does not have the at least one error. In some embodiments, determining whether the data has the at least one error comprises determining whether the data includes non-numerical data, whether the data includes an input value outside of an allowed range for the input value, and/or whether the data includes an incomplete form. In some embodiments, the decrypted result of the computation is generated from the partially decrypted share and at least one partially decrypted share generated by at least one of the one or more devices.

FIG. 1A illustrates an example multi-party computation system, according to some embodiments of the technology described herein. The multi-party computation system includes a central computer system 100 and devices 102, 104, 106, 108 associated with respective parties. The system includes a network 110 through which the central computer system 100 may communicate with the party devices 102, 104, 106, 108.

The central computer system 100 may be any suitable computing system. In some embodiments, the central computer system 100 may be a desktop computer. In some embodiments the central computer system 100 may be a server. Although the example of FIG. 1A illustrates the central computer system 100 as a single entity, in some embodiments, the central computer system may include one or multiple computing devices. For example, the central computer system 100 may be implemented on a peer to peer network over multiple computing devices (e.g., the party devices 102, 104, 106, 108). As shown in FIG. 1A, the central computer system may include multiple different software components. Each of the software components may be implemented by a set of instructions (e.g., software code). The components of the central computer system 100 include a key generation component 100A, a data processing component 100B, and a graphical user interface (GUI) component 100C.

The key generation component 100A may be configured to generate a key that is shared among multiple parties that are involved in a multi-party computation. The shared key may be used by the party devices 102, 104, 106, 108 to encrypted respective data sets that are to be used to perform the computation. The key generation component 100A may be configured to: (1) obtain a key from each of multiple parties (e.g., that was generated by the party); and (2) generate the shared key (e.g., a shared public key) using the keys obtained from the multiple parties. In some embodiments, the key obtained from each party may be a public key corresponding to a private key of the party. The public key may be an encryption key and the private key may be a corresponding decryption key. For example, the public key may be a public key of a key pair generated using the Rivest-Shamir-Adleman (RSA) algorithm, an elliptic curve cryptography (ECK) algorithm, a digital signature algorithm (DASH), or other suitable technique. The key generation component 100A may be configured to generate a shared public key (also referred to as a "meta-public key") using the keys (e.g., public keys). For example, the key generation component 100A may concatenate the keys to obtain the shared key. In another example, the key generation component 100A may determine a mathematical combination of the keys to obtain the shared key. The central computer system 100 may be configured to transmit the shared key to the party devices (e.g., through network 110).

In some embodiments, the key generation component 100A may be configured to obtain keys (e.g., public keys) from all the party devices involved in a multi-party computation. The key generation component 100A may be configured to generate the shared key using the keys obtained from all the party devices. In some embodiments, the key generation component 100A may be configured to obtain keys from a subset of the party devices involved in the multi-party computation. The key generation component 100A may be configured to generate the shared key using the keys obtained from the subset of party devices. A party device that generates a key that is used by the key generation component 100A to generate the shared key may also be referred to as a "keyholder" or a "keyholder device". A keyholder device may be configured to perform The data processing component 100B of the central computer system 100 may be configured to perform a computation on data obtained from party devices. In some embodiments, the data processing component 100B may be configured to: (1) obtain encrypted data sets from the party devices (e.g., party devices 102, 104, 106, 108); (2) combine the encrypted data sets to obtain encrypted aggregate data; and (3) perform a computation on the encrypted aggregate data to obtain an encrypted result of the computation. In some embodiments, an encrypted data set may be an encrypted file (e.g., a CSV file, JSON file, PARQUET file, AVRO file, an image file, or any other suitable file). For example, the encrypted file may include ciphertext generated using a shared key (e.g., an encryption key). As an illustrative example, each of the encrypted data sets obtained from the party devices may include encrypted counts of different types of cybersecurity incidents. As another example, each of the encrypted data sets may include monetary loss for each of different types of cybersecurity failures. In another example, each of the encrypted data sets may include occupancy of a hotel for different size rooms. The data processing component 100B may combine the encrypted data sets to obtain the encrypted aggregate data. For example, the data processing component 100B may sum values in the encrypted data sets. The data processing component 100B may then perform computations on the encrypted aggregate data. For example, the data processing component 100B may determine summary statistics using the aggregate data (e.g., total, or mean number of cybersecurity incidents of each category, total or mean monetary loss resulting from cybersecurity failures in each category, total or mean occupancy in each type of hotel room, etc.). The data processing component 100B may be configured to perform the computations on encrypted data, and thus is not able to access the data. In some embodiments, the data processing component 100B may be configured to perform the computations on the encrypted data using a homomorphic encryption scheme. For example, the data processing component 100B may use the Brakerski/Fan-Vercauteren (BFV) homomorphic encryption scheme, Brakerski-Gentry-Vaikuntanathan (BGV) homomorphic encryption scheme, and/or the Cheon-Kim-Kim-Song (CKKS) homomorphic encryption scheme to perform the computations on the encrypted data without accessing the data.

The data processing component may be configured to decrypt a result of a computation. The data processing component 100B may be configured to decrypt the result by: (1) transmitting an encrypted result (e.g., a ciphertext) of a computation to multiple party devices; (2) receiving partially decrypted shares of the result (e.g., partially decrypted ciphertext) from the party devices; and (3) generating the decrypted result of the computation using the partially decrypted shares of the result. Each of the party devices may be configured to use a private key of the device to perform a partial decryption of the encrypted result to generate a respective partially decrypted share. In some embodiments, the data processing component 100B may be configured to obtain partially decrypted shares from all of the party devices involved in the multi-party computation. In some embodiments, the data processing component 100B may be configured to obtain partially decrypted shares from a subset of the party devices. The data processing component 100B may obtain partially decrypted shares from party devices that provided keys (e.g., public keys) that were used by the key generation component 100A to generate a shared key. In some embodiments, the data processing component 100B may be configured to use a threshold cryptographic scheme in which the data processing component 100B needs a threshold number (e.g., 2, 3, 4, 5, 6, 7, 8, 9, or 10) of partially decrypted shares to decrypt the result of the computation. For example, the data processing component 100B may use Shamir's secret sharing scheme to decrypt the result using a threshold number of decrypted shares. In some embodiments, the data processing component 100B may obtain partially decrypted shares from some, but not all, of the keyholder devices.

The data processing component 100B may be configured to generate the decrypted result of the computation performed on aggregate encrypted data using partially decrypted shares obtained from multiple party devices. In some embodiments, the data processing component 100B may be configured to generate the decrypted result using the partially decrypted shares by combining the partially decrypted shares to obtain the decrypted result of the computation. For example, the data processing component 100B may sum the partially decrypted shares to obtain the decrypted result of the computation. In another example, the data processing component 100B may further round an obtained sum of the partially decrypted shares to obtain the decrypted result of the computation. In another example, the data processing component 100B may concatenate the partially decrypted shares in order to obtain the decrypted result of the computation.

The graphical user interface (GUI) component 100C may be configured to generate a GUI that allows users of the party devices 102, 104, 106, 108 to participate in a multi-party computation. The GUI may include a graphical element that allows a user to initiate generation of a shared key. For example, the GUI may include a button that, when selected, indicates a command to generate a shared key. The GUI may allow a user to input data and encrypt data. For example, the GUI may allow a user to upload a file, and include a graphical element that, when selected, causes the device to encrypt uploaded data using a shared key. In some embodiments, the GUI may allow a user to input data and command encryption of the entered data. In some embodiments, the GUI may include a graphical element that allows a user to transmit encrypted data to the central computer system 100. For example, the graphical element may be a button that, when selected, causes the device to transmit an encrypted data set to the central computer system 100. An example GUI that may be generated by the GUI component 100C is described herein with reference to FIGS. 7A-C.

Each of the party devices 102, 104, 106, 108 may be a computing device associated with a respective party. For example, party device 102 may be a computing device of a first firm, party 2 device 104 may be a computing device of a second firm, party 3 device 106 may be a computing device of a third firm, and party 4 device 108 may be a computing device of a fourth firm. Each of the party devices 102, 104, 106, 108 may be any suitable computing device. For example, each party device may be a desktop computer, a server, a mobile computing device (e.g., laptop, smartphone, or tablet), or other suitable computing device. In some embodiments, a party device may store instructions for performing one or more functions. For example, the party device may have a software application to performing one or more functions described herein. To illustrate, the party device may store a JAVASCRIPT program that, when executed by the device using an Internet browser application, causes the device to perform one or more functions described herein (e.g., key generation, data encryption, and/or data transmission). As another example, the party device may store an EXCEL macro that, when executed by the device using MICROSOFT EXCEL, causes the device to perform one or more functions described herein (e.g., data pre-processing and/or error checking).

Multiple ones of the party devices 102, 104, 106, 108 may be keyholder device. A keyholder is a device which provides a key (e.g., a public key corresponding to a private key of the device) that is used to generate a shared key (e.g., a shared public key). A keyholder device may be configured to generate a key pair consisting of a private key and a public key. For example, the device may generate the key pair using the Rivest-Shamir-Adleman (RSA) algorithm, an elliptic curve cryptography (ECK) algorithm, or a digital signature algorithm (DASH). The private key may be used for decrypting while the public key may be used for encryption. In some embodiments, all the party devices 102, 104, 106, 108 may be keyholder devices. In some embodiments, some of the party devices 102, 104, 106, 108 may be keyholder devices, while one or more other devices may not be keyholder devices. A party device that is not a keyholder device may participate in a multi-party computation by contributing data (e.g., an encrypted data set) and obtaining a result of a computation performed on aggregate data (e.g., a decryption of a computation result). A non-keyholder thus may not need to generate a key pair (e.g., a private key and corresponding public key) or participate in decryption.

A keyholder device may be configured to partially decrypt an encrypted result of a computation performed on aggregate encrypted data. The device may be configured to partially decrypt the unencrypted result using a private key corresponding to a public key (e.g., provided to the central computer system 100 for generation of a shared key). In some embodiments, the encrypted result of the computation may be a ciphertext, and the device may be configured to partially decrypt the ciphertext using the private key. For example, the device may perform substitution or transposition using the private key to partially decrypt the unencrypted result. The device may be configured to obtain a partially decrypted share of the result, and transmit the partially decrypted share to the central computer system 100 (e.g., for use in generating the decrypted result of the computation).

Each of the party devices 102, 104, 106, 108 may be configured to pre-process data prior to transmitting the data to the central computer system 100. In some embodiments, a device may include instructions that, when executed by the device, cause the device perform pre-processing on the data. For example, the instructions may be a macro (e.g., an EXCEL macro) that, when executed, perform the pre-processing on the data. The pre-processing may include performing one or more checks on the data. As the data will be encrypted and then transmitted to the central computer system 100, the central computer system 100 may be unable to perform the check(s) on the data. For example, the device may determine whether the data includes non-numeric inputs. In another example, the device may determine whether the data includes numbers that are outside of an allowable range (e.g., out of bounds). In another example, the device may determine whether there are incomplete portions of an input file (e.g., an input form) through which data is to be provided to the central computer system 100. In some embodiments, the device may be configured to determine, using the data, one or more values that are to be used in the computation performed on the aggregate data. For example, the device may generate counts for one or more cybersecurity categories that are to be used in the computation.

The network 110 may be a communication network through which the central computer system 100 communicates with the party devices 102, 104, 106, 108. In some embodiments, the network 110 may be the Internet. In some embodiments, the network 110 may be a local area connection (LAN). In some embodiments, the network 110 may be a wired network. In some embodiments, the network 110 may be a wireless network.

Figure 1B:
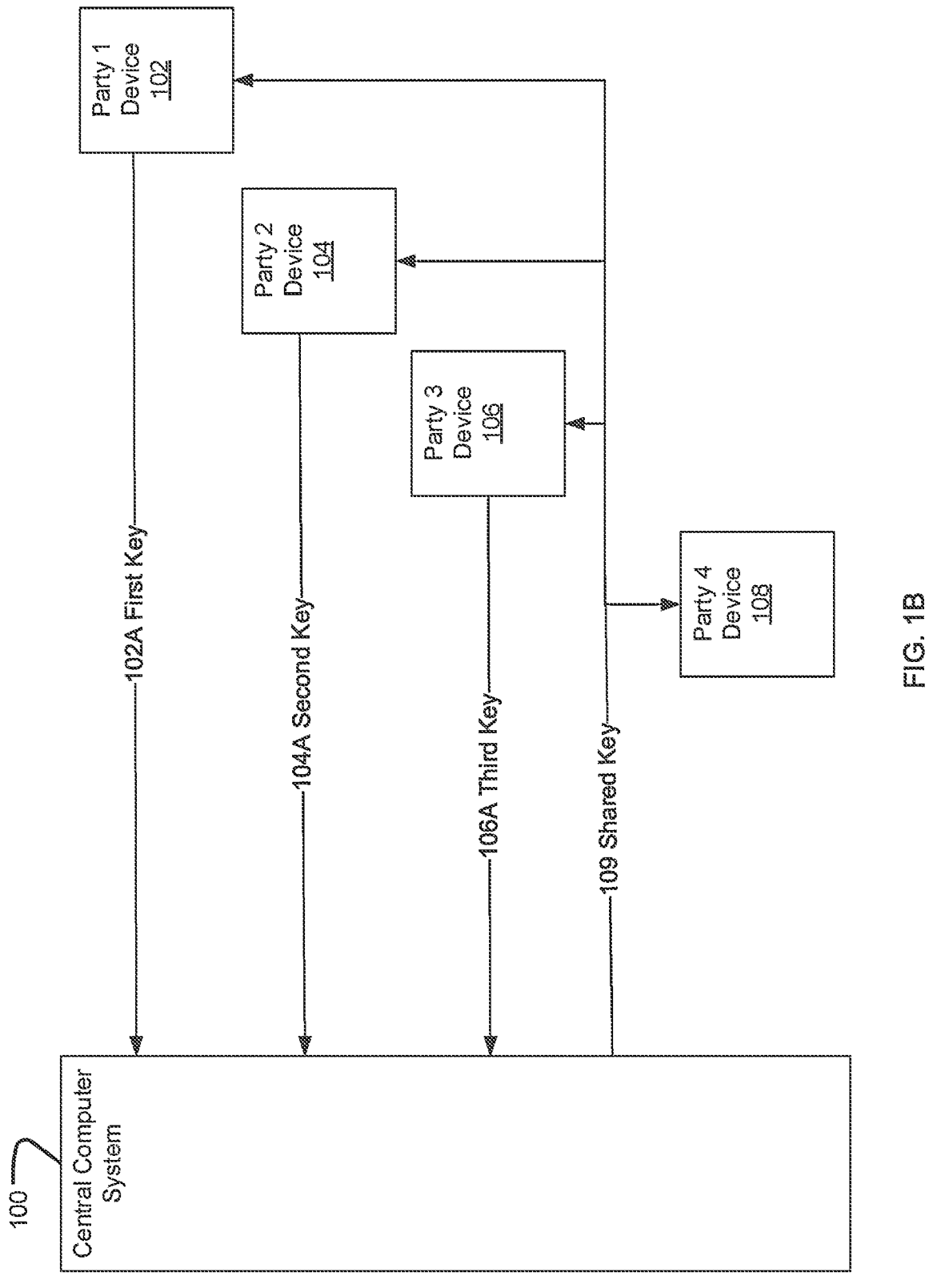
FIG. 1B illustrates generation of a shared key in the multi-party computation system of FIG. 1A, according to some embodiments of the technology described herein.

FIG. 1B illustrates generation of a shared key in the multi-party computation system of FIG. 1A, according to some embodiments of the technology described herein. As shown in FIG. 1B, the central computer system 100 receives a first key 102A from the party 1 device 102, a second key 104A from the party 2 device 104, and a third key 106A from the party 3 device 106. In some embodiments, each of the first key 102A, second key 104A, and third key 106A may be a public key corresponding to a respective private key held by a respective private device. The key generation component 100A may be configured to generate a shared key 109 using the first key 102A, second key 104A, and third key 106A (e.g., by combining the keys). The central computer system 100 may be configured to transmit the shared key 109 to the party devices 102, 104, 106, 108. As illustrated in the example of FIG. 1B, parties 1, 2, and 3 provide keys that are used to generate the shared key 109 while party 4 receives the shared key without providing a key. In some embodiments, party 4 may also provide a key to the central computer system for use in generating the shared key 109.

Figure 1C:
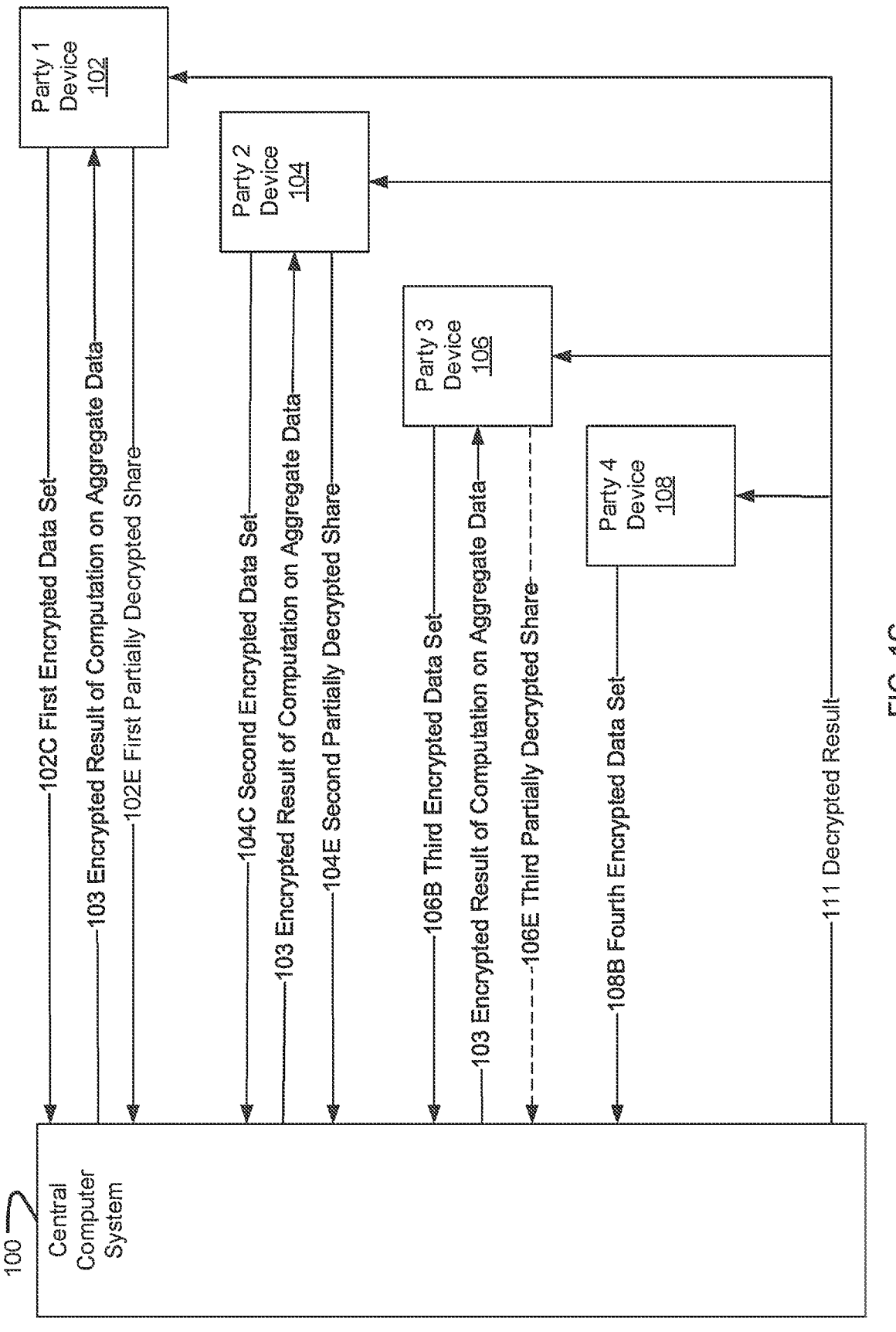
FIG. 1C illustrates performance of a computation using data from different parties in the multi-party computation system of FIG. 1A, according to some embodiments of the technology described herein.

FIG. 1C illustrates performance of a computation using data from different parties in the multi-party computation system of FIG. 1A, according to some embodiments of the technology described herein. Each of the party devices 102, 104, 106, 108 may be configured to generate its respective encrypted data set by: (1) obtaining data; and (2) encrypting the data using a shared key (e.g., shared key 109 of FIG. 1B) to generate the encrypted data set. Party 1 device 102 generates a first encrypted data set 102C, party 2 device 104 generates a second encrypted data set 104C, party 3 device generates a third encrypted data set 106B, and party 4 device 108 generates a fourth encrypted data set 108B. In some embodiments, the encrypted data sets 102C, 104C, 106C, 108C generated by the respective party devices 102, 104, 106, 108 may be homomorphic encryptions that allow computations to be performed on the encrypted data sets. The data processing component 100B may be configured to aggregate the encrypted data sets 102C, 104C, 106C, 108C into an aggregate encrypted data set. The data processing component 100B may be configured to perform a computation on the aggregate encrypted data set to obtain an encrypted result of the computation. For example, the data processing component 100B may perform a computation on encrypted cybersecurity data received from devices of respective firms to generate a set of encrypted summary statistics for the firms. In another example, the data processing component 100B may perform a computation on encrypted hotel patronage data from devices of respective hotels to generate a set of encrypted summary statistics for the hotels.

As shown in FIG. 1C, the central computer system 100 transmits (e.g., through the network 110) an encrypted result of the computation performed on the aggregate data to multiple keyholder devices. In the example of FIG. 1C, the central computer system 100 transmits the encrypted result to party devices 102, 104, 106, which provided keys (e.g., public keys) for generation of a shared key as described with reference to FIG. 1B. Each of the party devices 102, 104, 106 may be configured to generate a partially decrypted share of the result of the computation performed on the aggregate data using a private key of the device. Party 1 device 102 may be configured to use a first private key to generate a first partially decrypted share 102E, party 2 device 104 may be configured to use a second private key to generate a second partially decrypted share 104E, and party 3 device 106 may be configured to use a third private key to generate a third partially decrypted share 106E. The party devices 102, 104, 106 may be configured to transmit (e.g., through network 110) respective partially decrypted shares 102E, 104E, 106E to the central computer system 100. The central computer system 100 may be configured to use the partially decrypted shares 102E, 104E, 106E to generate a decrypted result of the computation 111. The central computer system 100 may be configured to transmit (e.g., through network 110) the decrypted result 111 to the party devices 102, 104, 106, 108.

In the example of FIG. 1C, party 4 device 108 does not participate in decryption of the encryption result. As the party 4 device 108 is not a keyholder, the device does not participate in partial decryption. In other example implementations, party 4 device 108 may also be a keyholder and thus receive the encrypted result of the computation, and generate a respective decrypted share. In some embodiments, all parties may be keyholders. In some embodiments, some party devices may be keyholders while one or more other party devices may not be keyholders.

As indicated by the dotted line of the transmission of the third partially decrypted share 106E, the central computer system 100 may not receive the third partially decrypted share 106E. For example, the party 3 device 106 may not be available to provide the third partially decrypted share 106E (e.g., due to loss of connectivity). In this example, the central computer system 100 may decrypt the result of the computation using the first partially decrypted share 102E and the second partially decrypted share 104E, without using the third partially decrypted share 106E. Thus, the central computer system 100 may not need partially decrypted shares from all the keyholders to generate the decrypted result 111. In other example implementations, the central computer system 100 may require partially decrypted shares from all keyholder devices to generate a decrypted result of the computation.

FIG. 2A illustrate an example process 200 for performing a multi-party computation, according to some embodiments of the technology described herein. In some embodiments, the process 200 may be performed in the multi-party computation system of FIGS. 1A-1C. For example, the central computer system may be central computer system 100, the first device may be party 1 device 102, and the second may be party 2 device 104 described herein with reference to FIGS. 1A-1C.

Process 200 begins at blocks 202A and 202B, where the first device generates a first key pair, and the second device generates a second key pair. In some embodiments, each key pair may be a public private key pair consisting of a private key and a corresponding public key. The public key may be an encryption key and the private key may be a decryption key. The public key may be distributed outside of the device. For example, a first public key of the first device and the second public key of the second device may be provided to the central computer system. In some embodiments, a device may be configured to generate a key pair using a key generation algorithm. For example, the device may generate a respective key pair using the Rivest-Shamir-Adleman algorithm (RSA), Elliptic Curve Digital Signature Algorithm (ECADS), Digital Signature Algorithm (DSA), and/or the Diffie-Hellman key agreement protocol. In some embodiments, the device may include a cryptographic software application that performs the key generation. For example, the device may include a JAVASCRIPT application that, when executed by an Internet browser application of the device, may generate a key pair. In some embodiments, a device may be configured to store the private key in memory of the device. The device may be configured to encrypt the private key. For example, the device may obtain a passphrase from a user, use the passphrase to encrypt the private key, and store the encrypted private key on the device.

After generating the first key pair at block 202A, the first device proceeds to block 204A where the first device transmits the first public key to the central computer system. After generating the second key pair at block 202B, the second device proceeds to block 204B where the second device transmits the second public key to the central computer system. For example, each of the first and second device may be configured to transmit its public key to the central computer system through a network (e.g., the Internet).

Next, at block 206 the central computer system generates a shared key (e.g., a shared public key) using the first and second public keys received from the first and second devices. The central computer system may be configured to generate the shared public key by combining the first and second public keys. For example, the central computer system may concatenate the first and second public keys to obtain the shared key. After generating the shared key, process 200 proceeds to block 208 where the central computer system transmits the shared key to the first and second devices. For example, the central computer system may transmit the shared key to the first and second devices through a network (e.g., the Internet).

Next, at block 210A, the first device generates a first encrypted data set using the shared key. At block 210B, the second device generates a second encrypted data set using the shared key. Each of the first and second devices may be configured to generate a respective encrypted data set by encrypting data using the shared key to obtain the encrypted data set (e.g., a ciphertext). For example, a device may encrypt a data file (e.g., a CSV file, or JSON file) using the shared key to generate a corresponding ciphertext. In some embodiments, the encrypted data set may be a homomorphic encryption that allows computations to be performed on the encrypted data set. In some embodiments, each of the devices may be configured to pre-process data prior to encrypting the data to generate an encrypted data set. As the data will be encrypted when sent to the central computer system, the central computer system may be unable to perform certain data and error checks. The device may be configured to perform one or more checks. For example, the device may determine whether the data includes non-numeric inputs, whether the data includes any numbers that are outside of a range, and/or whether the data is missing any values (e.g., incomplete forms). The device may be configured to execute instructions (e.g., an EXCEL macro) that perform the checks. The device may be configured to resolve an identified error and/or prompt a user to resolve the identified error (e.g., by generating an indication in a GUI informing the user of the error). In some embodiments, the device may be configured to prevent generation of the encrypted data set without an identified error being resolved.

After the first device generates its encrypted data set at block 210A, it proceeds to block 212A where the first device transmits the encrypted data set to the central computer system (e.g., through a network). After the second device generates its encrypted data set at block 210B, the second device proceeds to block 212B where the second device transmits the encrypted data set to the central computer system (e.g., through a network).

Next, at block 214, the central computer system performs a computation on an aggregate of the encrypted data sets. The central computer system may be configured to perform the computation while all the encrypted data sets remain encrypted. In some embodiments, the central computer system may be configured to perform the computation by combining the encrypted data sets. For example, the central computer system may perform the computation by summing values of the encrypted data sets. In another example, the central computer system may determine statistical information using values from the encrypted data sets (e.g., mean, median, maximum, minimum, and/or other statistical values). After performing the computation on the aggregate of the encrypted data sets, the central computer system proceeds to block 216 where the system transmits the encrypted result of the computation to the first and second devices (e.g., through a network).

In some embodiments, the central computer system may be configured to determine whether the computation would reveal data of any party involved in the computation. In some embodiments, the central computer system may be configured to determine whether the computation would reveal data of a party by determining whether the aggregate data includes any outliers that would indicate a party. If the system determines that there is such an outlier, the system may stop the computation. In some embodiments, the system may be configured to request the parties to remove and/or modify an outlier, and resubmit its encrypted data. The central computer system may be configured to perform the computation in multiple stages including a first stage in which the central computer system determines counts for particular variables (e.g., counts for different ranges of losses resulting from cybersecurity incidents). To illustrate, the central computer system may determine a number of cybersecurity incidents in the aggregated data in which parties lost $5,000-$50,000, a number of cybersecurity incidents in which a party lost $50,000-$500,000, a number of cybersecurity incidents in which a party lost $500,000-$5,000,000, a number of cybersecurity incidents in which a party lost $5,000,000-$50,000,000, a number of cybersecurity incidents in which a party lost $50,000,000-$500,000,000, and a number of cybersecurity incidents in which a party lost greater than $500,000,000. In this example, if the system determines that there was a single incident in which the party lost greater than $500,000,000, the system may determine that the aggregate data would reveal the cybersecurity incident that led to the loss. Thus, the central computer system may, for example, stop the computation and request that the participants remove or modify outliers in their respective datasets.

Next, at block 216A, the first device partially decrypts the encrypted result to obtain a first partially decrypted share of the computation result. At block 216B, the second device partially decrypts the encrypted result to obtain a second partially decrypted share of the computation result. Each of the first and second device may be configured to perform a partial decryption of the encrypted computation result using a private key of a key pair generated at blocks 202A, 202B. For example, each device may partially decrypt a ciphertext to obtain a partially decrypted share of the ciphertext. After partially decrypting the encrypted result of the computation, the first device proceeds to block 216A, where it transmits its partially decrypted share to the central computer system. After partially decrypting the encrypted result of the computation, the second device proceeds to block 216B, where it transmits its partially decrypted share to the central computer system.

Next, at block 220, the central computer system generates a decrypted result of the computation performed on the aggregate data using the partially decrypted shares received from the first and second devices. In some embodiments, the central computer system may be configured to generate the decrypted result of the computation using the partially decrypted shares by combining the partially decrypted shares. After generating the decrypted result of the computation, the central computer system may proceed to block 222, where the system transmits the decrypted result of the computation to the first and second devices. Each of the devices may display the decrypted result of the computation. For example, each of the devices may view summary statistics generated by the central computer system using the aggregate data.

Figure 2B:
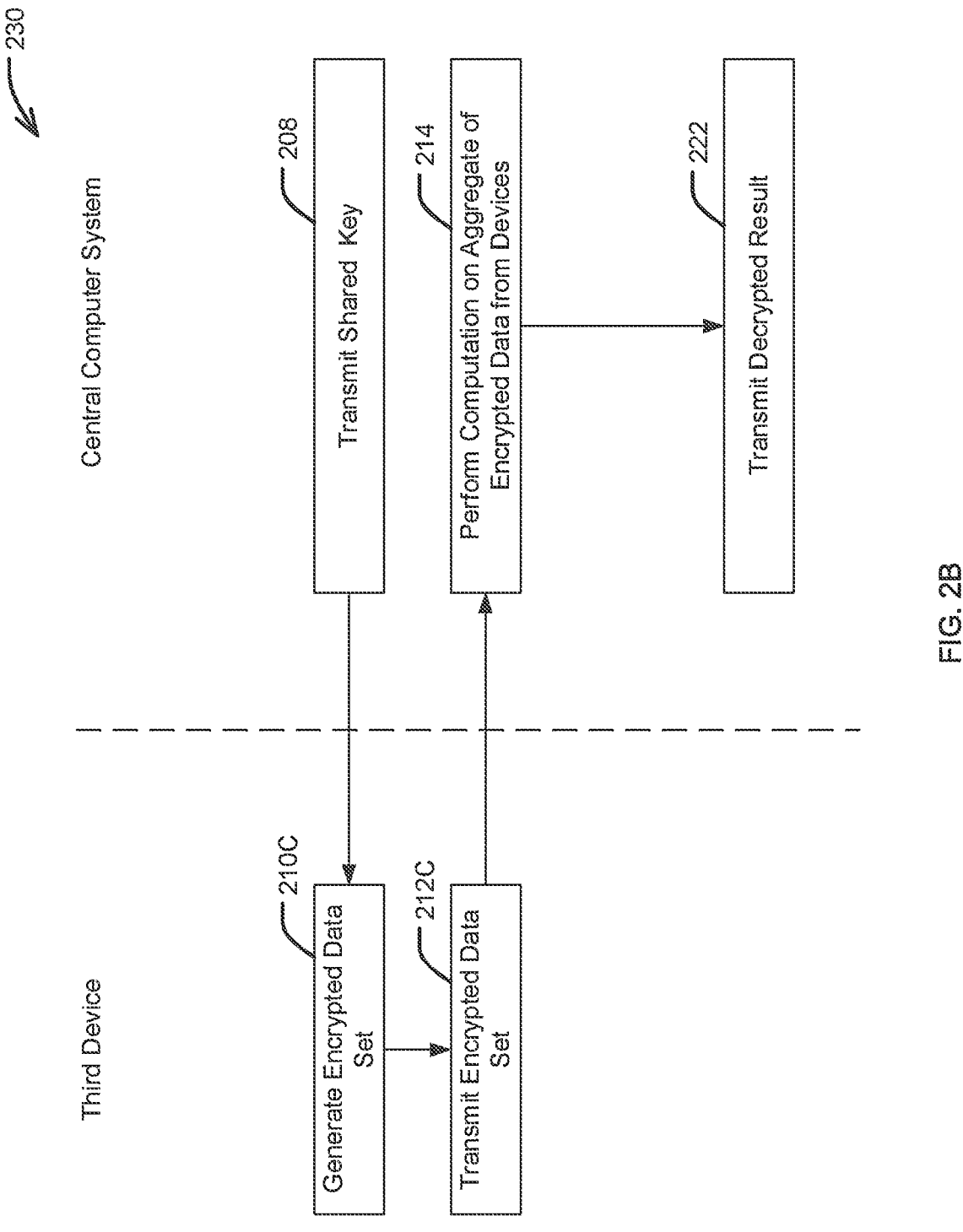
FIG. 2B illustrates an example process for a non-key-holder device to participate in the multi-party computation of FIG. 2A, according to some embodiments of the technology described herein.

FIG. 2B illustrates an example process 230 for a third device to participate in the multi-party computation process of 200 of FIG. 2A, according to some embodiments of the technology described herein. The third device may be a non-keyholder device. For example, the third device may be party device 4 108 of FIGS. 1A-C.

Process 230 begins at block 210C, where the third device generates an encrypted data set generated by the central computer system at block 206 of process 200. At block 208 (described herein with reference to FIG. 2A), the central computer system may further transmit the shared public key to the third device. The third device may be configured to generate the encrypted data set by using the shared key to encrypt a set of data (e.g., as described with reference to blocks 210A and 210B of FIG. 2A). After generating the encrypted data set, the third device proceeds to block 212C, where the third device transmits the encrypted data set to the central computer system. The central computer system may include the encrypted data set in the aggregate data, and perform the computation on the aggregate data as described at block 214. The central computer system may further obtain a decrypted result of the computation as described at blocks 216 to 220. At block 222, the central computer system may transmit the decrypted result of the computation to the third device in addition to the first and second devices. The third device may not participate in generation of the decrypted result.

Figure 3:
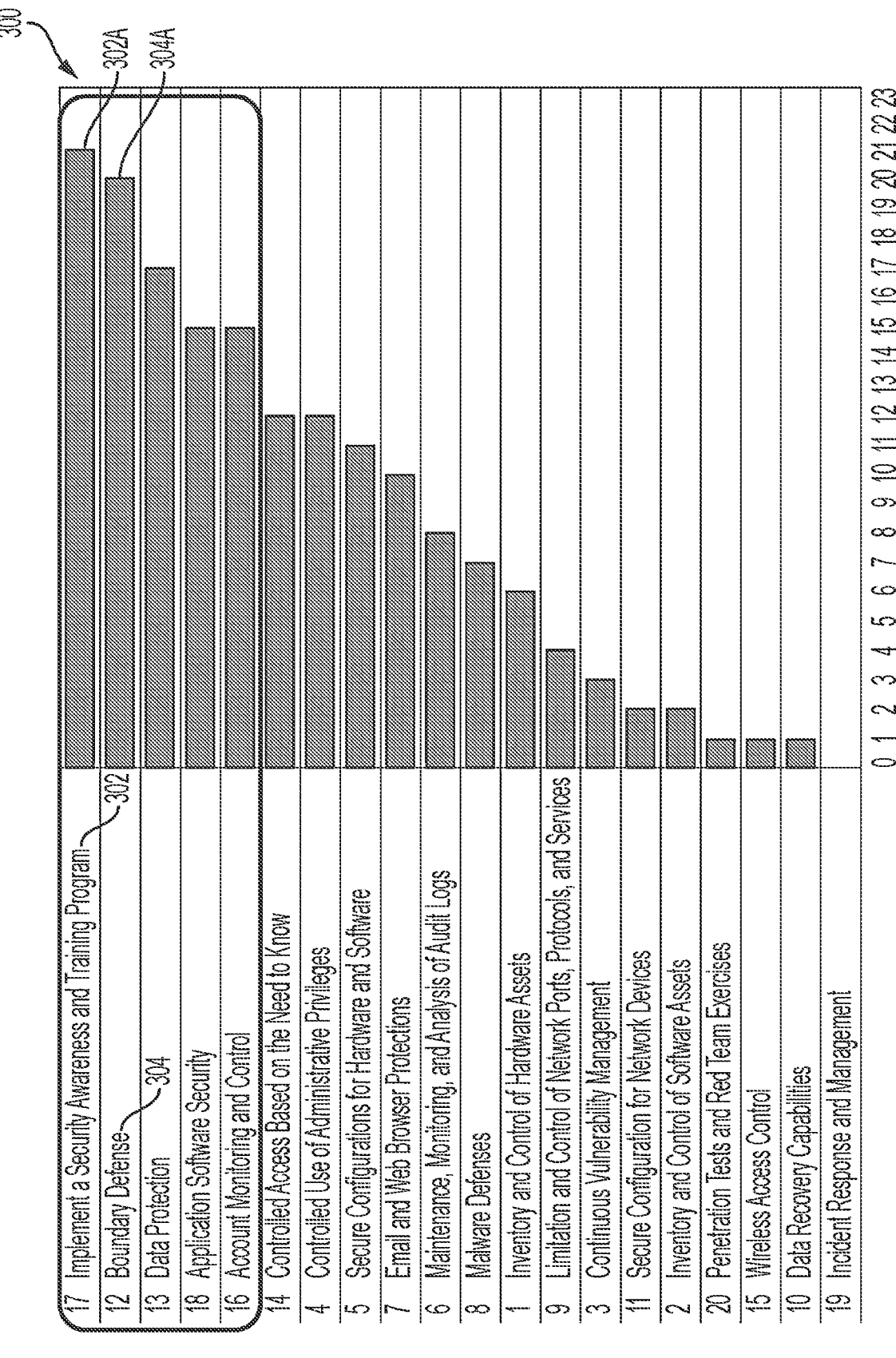
FIG. 3 illustrates a graph depicting results of a decrypted result of a multi-party computation, according to some embodiments of the technology described herein.

FIG. 3 illustrates a graph 300 depicting results of a decrypted result of a multi-party computation, according to some embodiments of the technology described herein. The information depicted by graph 300 may be obtained by performing process 200 and/or 230 described herein with reference to FIGS. 2A-2B in the system of FIGS. 1A-1C. For example, the information may be determined by performing a multi-party computation using cybersecurity information of respective parties. Each party device may provide an encrypted data set encrypting the number of incidents the party had for the various cybersecurity areas shown in graph 300. The graph 300 is a histogram of incident counts in different areas of cybersecurity. For example, the graph 300 indicates: a count 302A of 21 incidents related to implementing a security awareness and training program 302; a count 304A of 20 incidents related to boundary defense 304.

Figure 4:
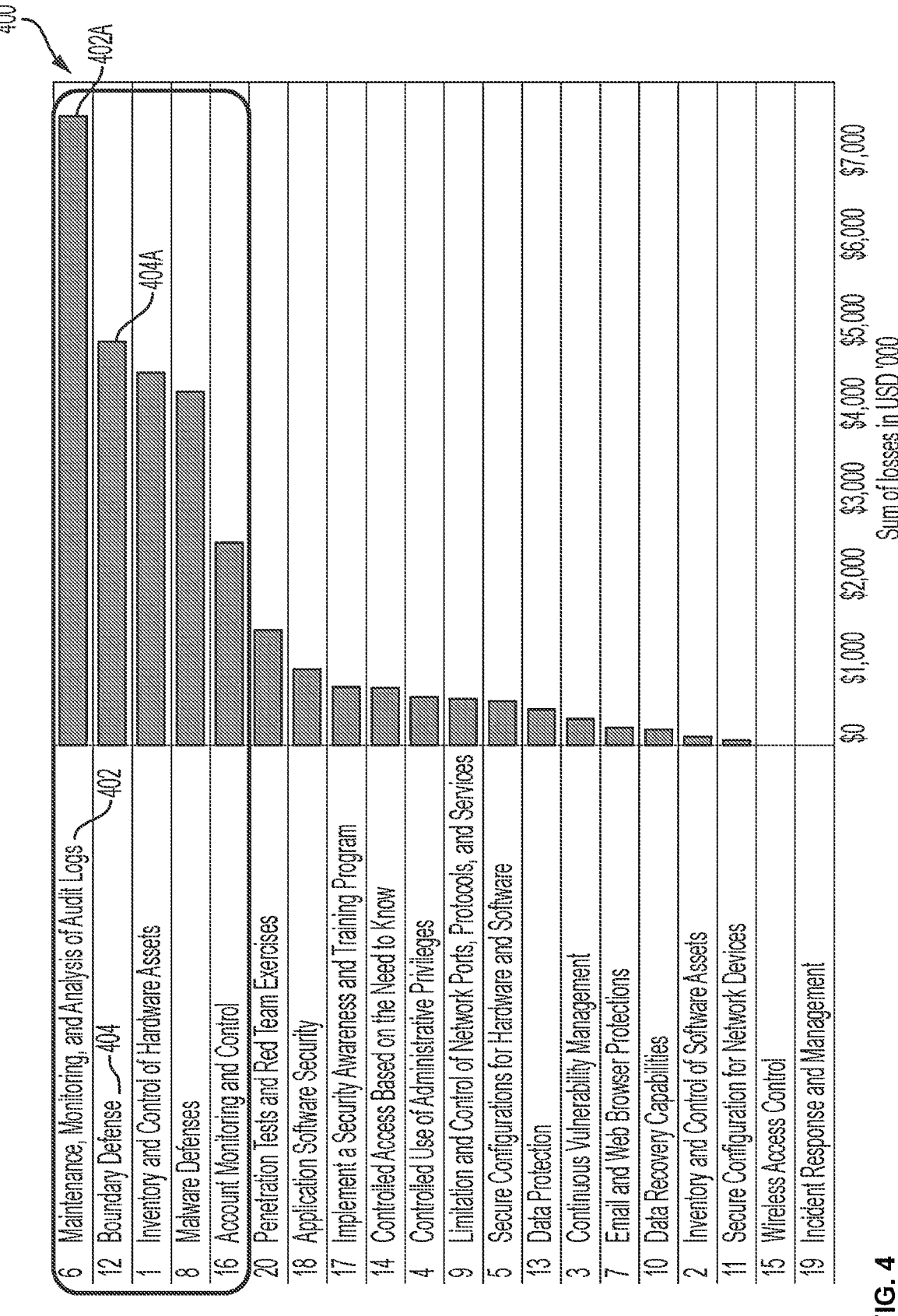
FIG. 4 illustrates a graph depicting results of a decrypted result of a multi-party computation, according to some embodiments of the technology described herein.

FIG. 4 illustrates a graph 400 depicting results of a decrypted result of a multi-party computation, according to some embodiments of the technology described herein. The information depicted by graph 400 may be obtained by performing process 200 and/or 230 described herein with reference to FIGS. 2A-2B in the system of FIGS. 1A-1C. For example, the information may be determined by performing a multi-party computation using cybersecurity information of respective parties. Each party device may provide an encrypted data set including values of the party's monetary loss for the various cybersecurity areas shown in graph 400. The graph 400 is a histogram of the sum of losses for different areas of cybersecurity. For example, graph 400 indicates: (1) a loss 402A of approximately $7 million for maintenance, monitoring, and analysis of audit logs 402; and (2) a loss 404A of approximately $5 million for boundary defense 404.

Figure 5:
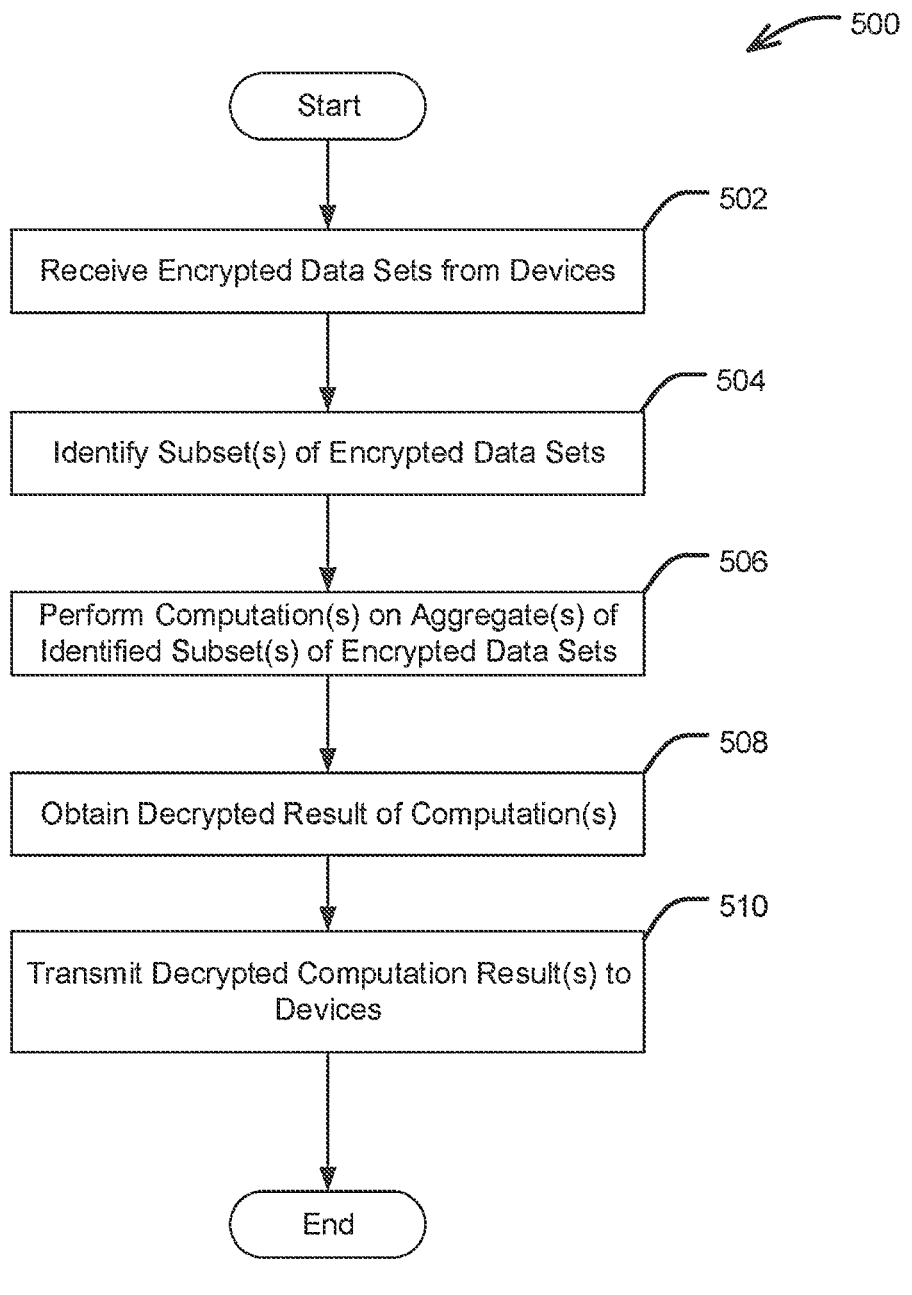
FIG. 5 illustrates an example process for performing a multi-party computation on a subset of encrypted data sets, according to some embodiments of the technology described herein.
Figure 6:
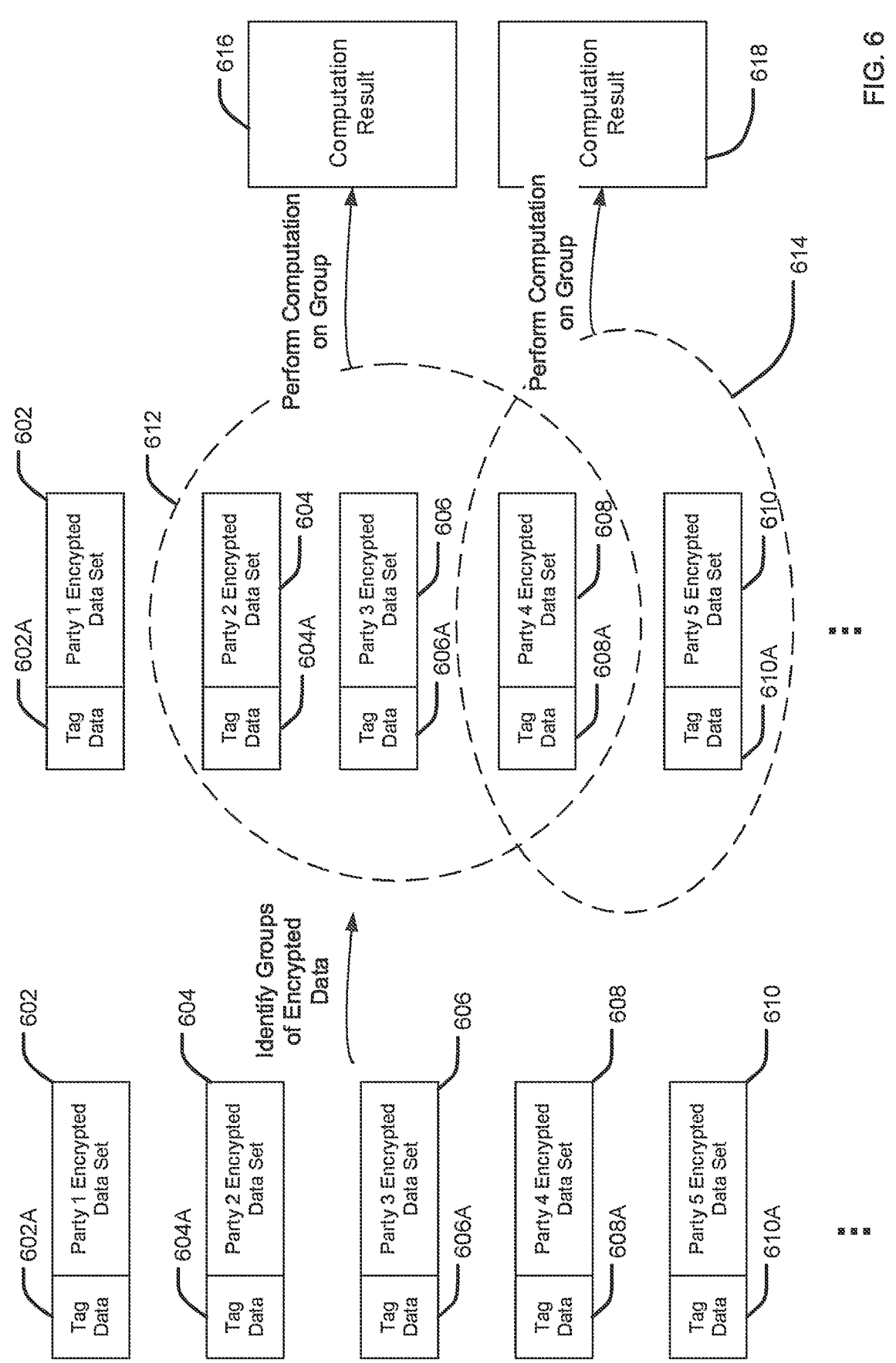
FIG. 6 illustrates a diagram depicting performance of a multi-party computation on groups of encrypted data sets, according to some embodiments of the technology described herein.

FIG. 5 illustrates an example process 500 for performing a multi-party computation on a subset of encrypted data sets, according to some embodiments of the technology described herein. Process 500 may be performed in the multi-party computing system described herein with reference to FIGS. 1A-1C. For example, process 500 may be performed by central computer system 100 of FIGS. 1A-1C. FIG. 6 illustrates a diagram depicting performance of the process 500, according to some embodiments of the technology described herein.

Process 500 begins at block 502, where the system receives encrypted data sets from devices associated with parties. Each encrypted data set may include encrypted information of one of the parties. In some embodiments, the system may be configured to receive the encrypted data sets through a network (e.g., the Internet). For example, as illustrated in FIG. 6, the system receives party 1 encrypted data set 602, party 2 encrypted data set 604, party 3 encrypted data set 606, party 4 encrypted data set 608, and party 5 encrypted data set 610.

Next, process 500 proceeds to block 504, where the system identifies one or more subsets of the encrypted data sets. In some embodiments, the system may be configured to identify a subset of encrypted data sets by identifying one or more encrypted data sets that share a characteristic. In some embodiments, the characteristic may be a characteristic of parties associated with the encrypted data set(s). The system may identify a subset of one or more encrypted data sets by: (1) identifying one or more encrypted data sets from among the received encrypted data sets that share a characteristic; and (2) determining the identified encrypted data sets to be the subset of encrypted data set(s). As an illustrative example, the parties may be hotels, and the encrypted data sets received from each of the hotels may be encrypted information (e.g., sales data, occupancy data, marketing data, or other information) about the hotel. In this example, the system may identify a subset of encrypted data sets that are from hotels in a particular geographic area. The system may identify the subset of encrypted data sets by: (1) identifying the hotels that are in the geographic area; and (2) determining encrypted data sets received rom the identified hotels to be a subset of encrypted data sets. FIG. 6 shows two example identified subsets of encrypted data sets. The subsets of encrypted data sets in FIG. 6 include: (1) a first subset 612 including party 2 encrypted data set 604, party 3 encrypted data set 606, and party 4 encrypted data set 608; and (2) a second subset 614 including party 4 encrypted data set 608, and party 5 encrypted data set 610.

In some embodiments, the system may be configured to store information about parties involved in a multi-party computation. For example, the system may store information about the party's geographic region, size, revenue, industry, age, and/or other characteristics about the party. In some embodiments, the system may be configured to obtain information about a party from public sources. For example, the system may obtain information about a party from the party's website. In some embodiments, the system may be configured to generate tag data associated with encrypted data sets. The system may be configured to store tag data associated with each encrypted data set. The tag data may include information about parties associated with respective encrypted data sets. Continuing with the example in which the parties are hotels, the tag data for each encrypted data set may include an indication of geographic region of the hotel, a size of the hotel, an age of the hotel, annual revenue of the hotel, and/or other information about the hotel. FIG. 6 shows tag data associated with respective encrypted data sets. For example, FIG. 6 shows tag data 602A associated with party 1 encrypted data set 602, tag data 604A associated with party 2 encrypted data set 604, tag data 606A associated with party 3 encrypted data set 606, tag data 608A associated with party 4 encrypted data set 608, and tag data 610A associated with party 5 encrypted data set 610.

In some embodiments, the system may be configured to use the tag data associated with encrypted data sets to identify a subset of encrypted data sets. The system may be configured to use the tag data to identify which encrypted data sets share a characteristic (e.g., are associated with parties that are in a given geographic region). The system may be configured to aggregate encrypted data sets in an identified subset. For example, the system may identify subset 612 by determining that tag data 604A, 606A, 608A each indicate that parties associated with encrypted data sets 604, 606, 608 are in the state of Florida. The system may aggregate the encrypted data sets in the subset 612. In another example, the system may identify subset 614 by determining that tag data 608A, 610A indicates that parties associated with encrypted data sets 608, 610 have an annual revenue of greater than $1 million. The system may aggregate the encrypted data sets in the subset 614.

Next, process 500 proceeds to block 506, where the system performs a computation on an aggregate of each of the identified subset(s) of encrypted data sets to obtain respective computation results. In FIG. 6, the system obtains a computation result 616 from performing a computation on the subset 612 of encrypted data sets, and a computation result 618 from performing a computation on the subset 618 of encrypted data sets. In some embodiments, the system may be configured to perform the same computation on multiple different subsets of encrypted data sets. In the example of FIG. 6, the system performs a computation on the subset 612 of encrypted data sets, and on the subset 614 of encrypted data sets. In some embodiments, the system may be configured to perform different computations on different subsets. For example, the system may perform a first computation on subset 612, and a second computation on subset 614. The system may be configured to perform a computation on each aggregate subset of encrypted data sets as described at block 214 of FIG. 2A.

In some embodiments, the system may be configured to determine whether a computation would reveal data of a party. The system may be configured to perform the computation on an aggregate of a subset of encrypted data sets when the system determines that the computation would not reveal data of a party. In some embodiments, the system may be configured to determine whether the computation would reveal data of a party as described herein with reference to block 214 of FIG. 2A. In some embodiments, the system may be configured to determine whether a computation on a subset would reveal data of a party by determining whether the number of encrypted data sets in a subset is less than a threshold number (e.g., 1, 2, 3, 4, 5, 6, 7, 8, 9, 10) of data sets. If the system determines that the number of encrypted data sets in a subset is less than the threshold number, the system may determine to not perform the computation on an aggregate of the subset of encrypted data sets to prevent revealing data of a party. As an illustrative example, if the system determines that a subset includes one encrypted data set, then the system may not perform a computation on the subset to protect an identity of a party associated with the encrypted data set. If the system determines that the number of encrypted data sets in the subset is greater than or equal to the threshold number, the system may perform the computation.

After performing the computation(s) at block 506, process 500 proceeds to block 508, where the system obtains a decrypted result of the computation(s). In some embodiments, the system may be configured to obtain the decrypted result of the computation(s) by performing steps of blocks 216 to 222 of process 200 described with reference to FIG. 2.

After obtaining the decrypted result of the computation(s), process 500 proceeds to block 510, where the system transmits decrypted computation result(s) to the devices. In some embodiments, the system may be configured to transmit the result of the computation performed on each subset of encrypted data sets to all party devices. For example, computation results 616, 618 of FIG. 6 may be transmitted to all parties. In some embodiments, the system may be configured to transmit the result of a computation performed on a subset of encrypted data set(s) to a subset of devices. For example, the system may transmit the result of the computation to a subset of devices associated with parties that provided the encrypted data set(s) in the subset. For example, the system may transmit decrypted computation result 616 to devices of party 2, party 3, and party 4. In another example, the system may transmit decrypted computation result 618 to devices of party 4 and party 5.

Figures 7A, 7B, 7C:
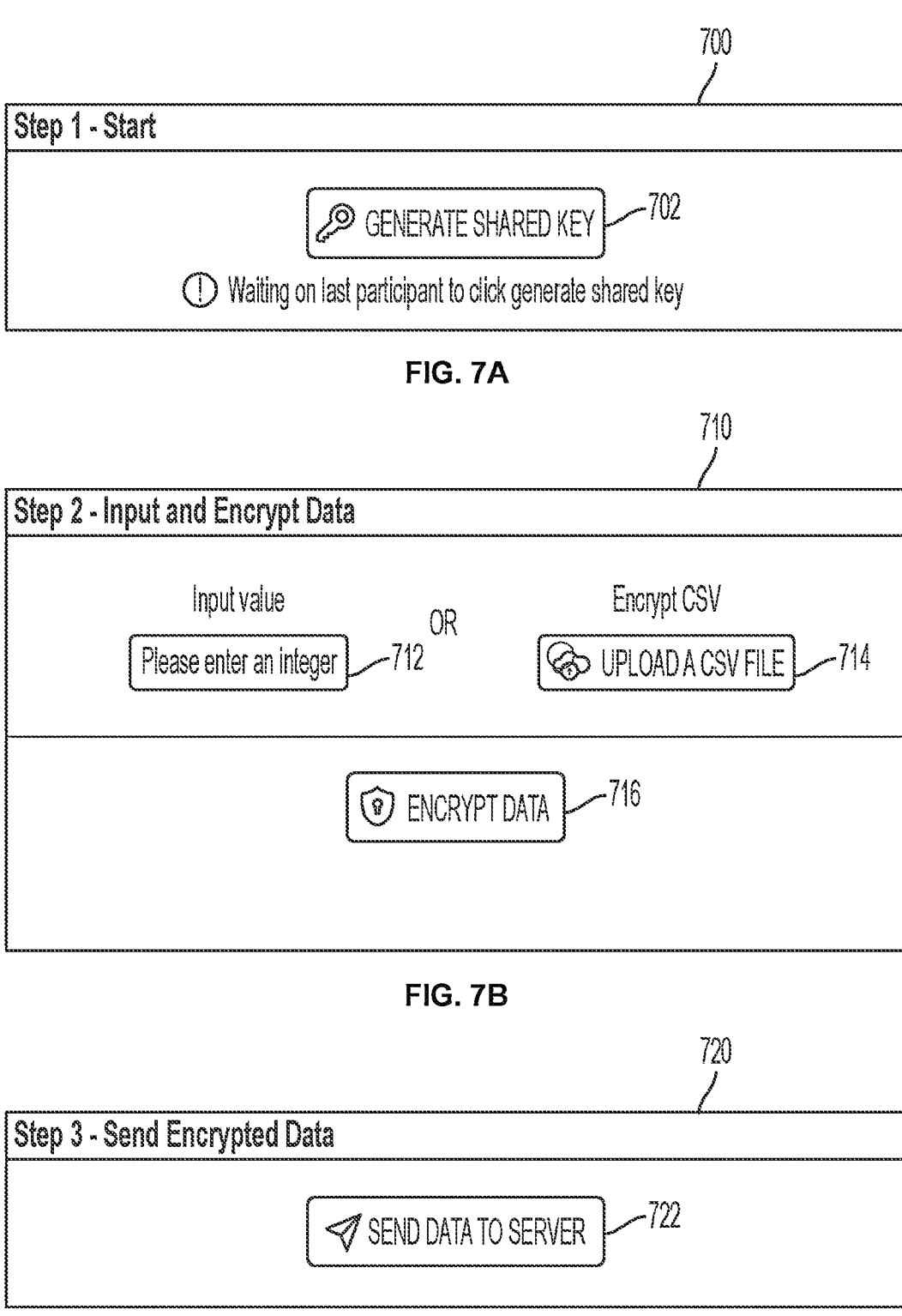
FIG. 7A illustrates an example graphical user interface (GUI) on a party device for generation of a shared key, according to some embodiments of the technology described herein.
FIG. 7B illustrates an example GUI on a party device for generating an encrypted data set, according to some embodiments of the technology described herein.
FIG. 7C illustrates an example GUI on a party device for transmission of encrypted data, according to some embodiments of the technology described herein.

FIG. 7A illustrates an example GUI 700 on a party device for generation of a shared key, according to some embodiments of the technology described herein. In some embodiments, the GUI 700 may be generated by the GUI component 100C of the central computer system 100 described herein with reference to FIGS. 1A-1C. The GUI 700 includes a GUI element 702 that, when selected through user input, initiates generation of a shared key. For example, a device may generate a key pair, and transmit a public key of the key pair in response to selection of the GUI element 702.

FIG. 7B illustrates an example GUI 710 on a party device for generating an encrypted data set, according to some embodiments of the technology described herein. In some embodiments, the GUI 710 may be generated by the GUI component 100C of the central computer system 100 described herein with reference to FIGS. 1A-1C. The GUI 710 includes a field 712 through which a user of the device may manually enter data. The GUI 714 includes a GUI element 714 that, when selected through user input, allows uploading of data. The GUI 716 includes a GUI element 716 that, when selected through user input, causes the device to encrypt data (e.g., manually inputted data and/or data in an uploaded file). For example, the device may encrypt the data using a key shared among multiple other party devices.

FIG. 7C illustrates an example GUI 720 on a party device for transmission of encrypted data, according to some embodiments of the technology described herein. In some embodiments, the GUI 720 may be generated by the GUI component 100C of the central computer system 100 described herein with reference to FIGS. 1A-1C. The GUI 720 includes a GUI element 722 that, when selected through user input, causes the device to transmit encrypted data (e.g., to a central computer system). For example, the device may transmit the encrypted data through a network (e.g., the Internet) in response to selection of the GUI element 722.

Figure 8:
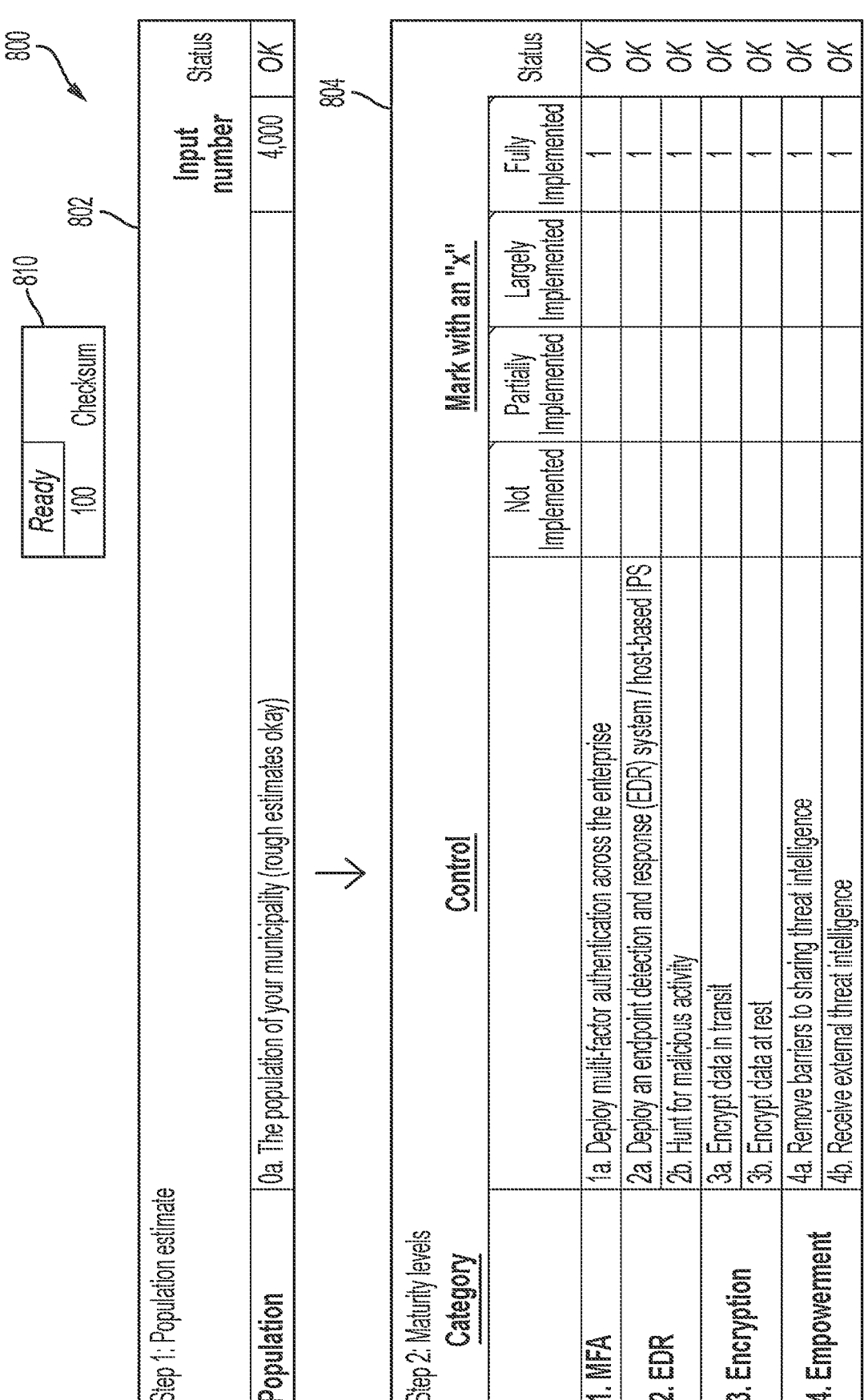
FIG. 8 illustrates an example set of input data that can be encrypted and used in a multi-party computation, according to some embodiments of the technology described herein.
Figure 8:
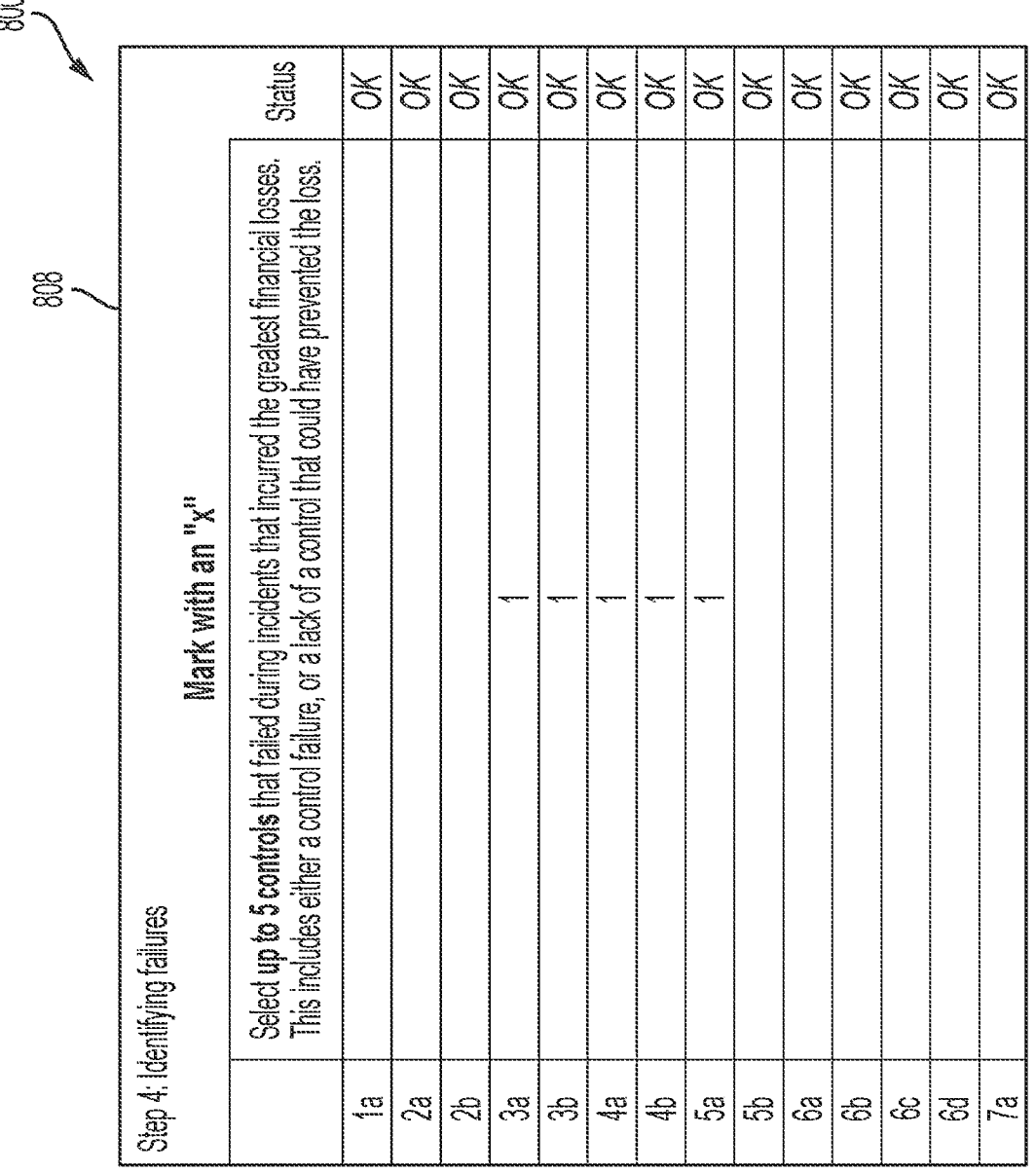

FIG. 8 illustrates an example set of input data 800 of a participant that can be encrypted and used in a multi-party computation, according to some embodiments of the technology described herein. As shown in FIG. 8, the set of input data 800 includes a population estimate 802 of the number of people in a municipality of the participant. The set of input data 800 further includes data 804 about maturity levels of various areas of cybersecurity of the party. The data 804 indicates maturity of multi-factor authentication (MFA), an endpoint detection and response (EDR) system, encryption, empowerment, training, backup, patch, incident response, checking the work, and network segmentation. The set of input data 800 includes data 806 indicating the number of cybersecurity incidents between 2019 and 2021, and monetary losses resulting from those incidents. The set of input data 800 includes data 808 indicating cybersecurity failures that incurred the greatest financial losses. The set of input data 800 includes a checksum 810 that may be used to verify whether the set of input data 800 includes any errors. The set of input data 800 may be encrypted and provided for use in a multi-party computation. For example, the set of input data 800 may be aggregated with data from other participants to perform the multi-party computation on the aggregate data (e.g., as described herein with reference to FIGS. 1A-1C, FIGS. 2A-2B, and/or FIGS. 5-6).

Figure 9:
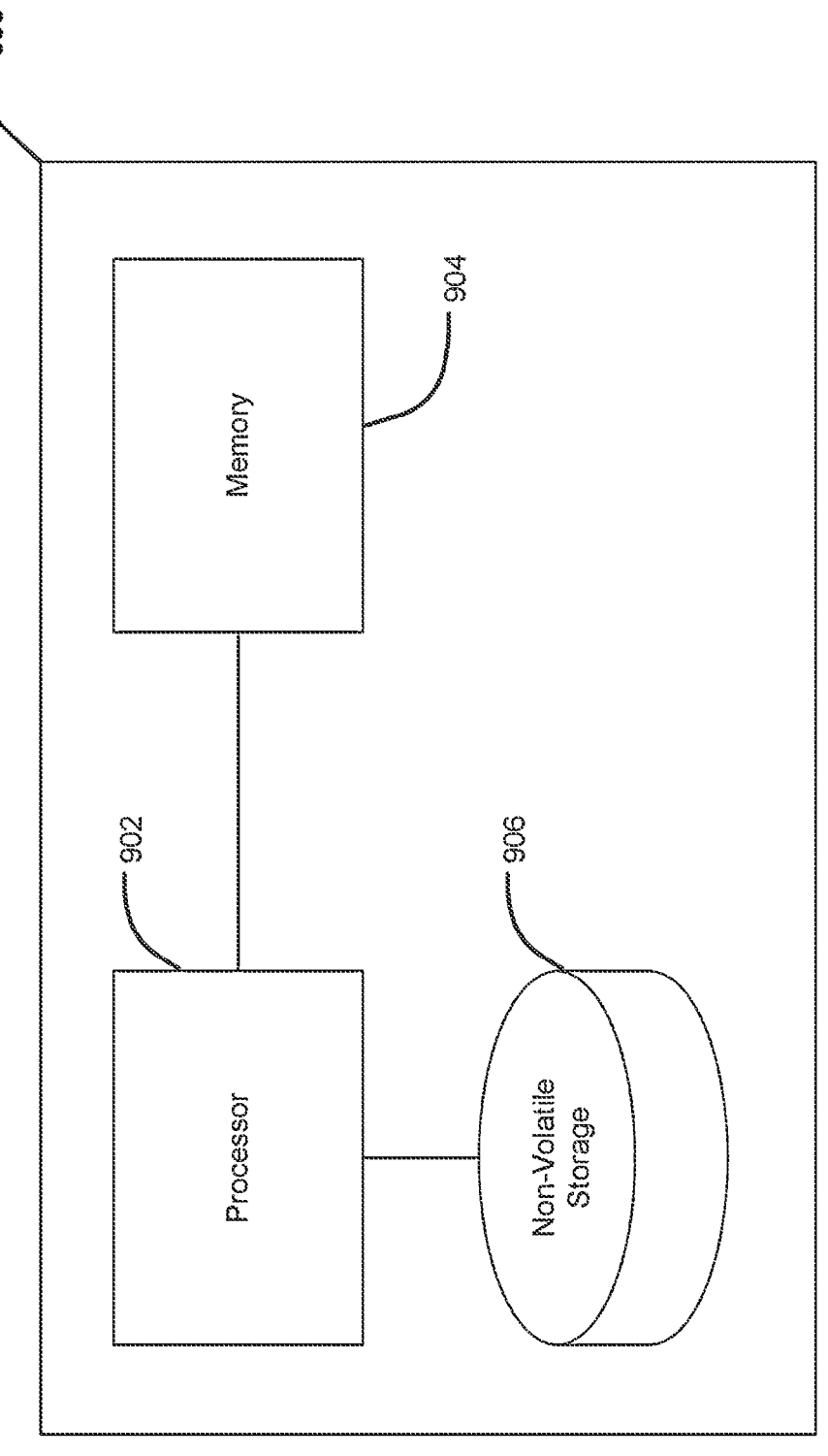
FIG. 9 is an illustrative implementation of a computer system that may be used in connection with some embodiments of the technology described herein.

FIG. 9 shows a block diagram of an example computer system 900 that may be used to implement some embodiments of the technology described herein. The computing device 900 may include one or more computer hardware processors 902 and non-transitory computer-readable storage media (e.g., memory 904 and one or more non-volatile storage devices 906). The processor(s) 902 may control writing data to and reading data from (1) the memory 904; and (2) the non-volatile storage device(s) 906. To perform any of the functionality described herein, the processor(s) 902 may execute one or more processor-executable instructions stored in one or more non-transitory computer-readable storage media (e.g., the memory 904), which may serve as non-transitory computer-readable storage media storing processor-executable instructions for execution by the processor(s) 902.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for performing a multi-party computation among a plurality of parties associated with devices, the system comprising:
   a processor; and
   a non-transitory computer-readable storage medium storing instructions that, when executed by the processor, cause the processor to:

generate a shared key, the generating comprising:
   receiving keys from at least some of the devices, the at least some devices including at least two devices associated with at least two of the plurality of parties;
   generating the shared key using the keys received from the at least two devices;
transmit the shared key to the devices associated with the plurality of parties;
receive encrypted data sets generated by the devices associated with the plurality of parties, wherein each of the encrypted data sets is generated by a respective one of the devices by encrypting data using the shared key;
perform a computation on an aggregate of the encrypted data sets to obtain an encrypted result of the computation;
transmit the encrypted result of the computation to the at least two devices associated with the at least two parties;
receive partially decrypted shares of the encrypted result generated by the at least two devices, wherein each of the partially decrypted shares is generated by a respective one of the least two devices by partially decrypting the encrypted result using a private key of the respective device; and
generate a decrypted result of the computation using the partially decrypted shares of the encrypted result.

2. The system of claim 1, wherein the keys received from the at least some devices are public keys corresponding to private keys of the at least some devices.

3. The system of claim 1, wherein the at least some devices include one or more devices in addition to the at least two devices.

4. The system of claim 1, wherein the devices consist of the at least some devices.

5. The system of claim 1, wherein the devices include one or more devices in addition to the at least some devices.

6. The system of claim 1, wherein the shared key comprises a public key.

7. The system of claim 1, wherein the instructions cause the processor to transmit the decrypted result to the devices.

8. The system of claim 1, wherein generating the decrypted result of the computation comprises combining the partially decrypted shares of the encrypted result to obtain the decrypted result of the computation.

9. The system of claim 1, wherein each of the encrypted data sets comprises an encryption of cybersecurity information of a respective one of the plurality of parties.

10. The system of claim 1, wherein each of the encrypted data sets is:
   checked for at least one error by a respective one of the devices; and
   received by the system after it is determined that the encrypted data set does not have the at least one error.

11. The system of claim 10, wherein the at least one error for an encrypted data set comprises:
   presence of non-numerical data in the encrypted data set;
   presence of an input value outside of an allowed range for the input value; and/or
   an incomplete form in the encrypted data set.

12. The system of claim 1, wherein the instructions cause the processor to:
   prior to performing the computation on an aggregate of the encrypted data sets:
      determine whether performance of the computation would reveal information about any of the plurality of parties; and perform the computation on the aggregate of the encrypted data sets when it is determined that performance of the computation would not reveal information about any of the plurality of parties.

13. The system of claim 12, wherein determining whether performance of the computation would reveal information about any of the plurality of parties comprises determining if the aggregate of the encrypted data set includes an outlier.

14. A method for performing a multi-party computation among a plurality of parties associated with devices, the method comprising:

generating a shared key, the generating comprising:

receiving keys from at least some of the devices, the at least some devices including at least two devices associated with at least two of the plurality of parties;

generating the shared key using the keys received from the at least two devices;

transmitting the shared key to the devices associated with the plurality of parties;

receiving encrypted data sets generated by devices associated with the plurality of parties, wherein each of the encrypted data sets is generated by a respective one of the devices by encrypting data using the shared key to obtain the encrypted data set;

performing a computation on an aggregate of the encrypted data sets to obtain an encrypted result of the computation;

transmitting the encrypted result of the computation to the at least two devices associated with the at least two parties;

receiving partially decrypted shares of the encrypted result generated by the at least two devices, wherein each of the partially decrypted shares is generated by a respective one of the least two devices by partially decrypting the encrypted result using a private key of the respective device; and generating a decrypted result of the computation using the partially decrypted shares of the encrypted result.

15. The method of claim 14, wherein the keys received from the at least some devices are public keys corresponding to private keys of the at least some devices.

16. A device comprising:

a processor; and non-transitory computer-readable storage medium storing instructions that, when executed by the processor, cause the processor to:

generate a public key corresponding to a private key of the device;

transmit, to a computer system, the public key;

receive, from the computer system, a key shared with one or more other devices, wherein the shared key is generated by the computer system using the public key;

encrypt data using the shared key to obtain an encrypted data set;

transmit, to the computer system, the encrypted data set;

receive, from the computer system, an encrypted result of a computation performed on an aggregate of:

the encrypted data set; and one or more encrypted data sets generated by the one or more other devices;

partially decrypt, using a private key of the device, the encrypted result to obtain a partially decrypted share of the encrypted result;

transmit, to the computer system, the partially decrypted share of the encrypted result; and receive, from the computer system, a decrypted result of the computation.

17. The device of claim 16, wherein the shared key is generated by the computer system using the public key and one or more public keys of the one or more other devices.

* * * * *